US012216293B2

(12) United States Patent
Kang et al.

(10) Patent No.: US 12,216,293 B2
(45) Date of Patent: Feb. 4, 2025

(54) PRISM APPARATUS AND CAMERA APPARATUS INCLUDING THE SAME

(71) Applicant: LG ELECTRONICS INC., Seoul (KR)

(72) Inventors: Hyungjoo Kang, Seoul (KR); Kwanhyung Kim, Seoul (KR); Dongryeol Lee, Seoul (KR); Samnyol Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 888 days.

(21) Appl. No.: 17/292,335

(22) PCT Filed: Nov. 8, 2019

(86) PCT No.: PCT/KR2019/015188
§ 371 (c)(1),
(2) Date: May 7, 2021

(87) PCT Pub. No.: WO2020/096423
PCT Pub. Date: May 14, 2020

(65) Prior Publication Data
US 2022/0004018 A1 Jan. 6, 2022

(30) Foreign Application Priority Data
Nov. 9, 2018 (KR) .................. 10-2018-0137510

(51) Int. Cl.
*G02B 27/64* (2006.01)
*G02B 3/14* (2006.01)
*G02B 7/18* (2021.01)

(52) U.S. Cl.
CPC ............. *G02B 27/646* (2013.01); *G02B 3/14* (2013.01); *G02B 7/1805* (2013.01)

(58) Field of Classification Search
CPC ....... G02B 27/646; G02B 3/14; G02B 7/1805
(Continued)

(56) References Cited

U.S. PATENT DOCUMENTS

2006/0022950 A1* 2/2006 Friedrichs ........... H04M 1/0222
345/169
2006/0268431 A1* 11/2006 Jin ....................... G02B 27/646
359/726
(Continued)

FOREIGN PATENT DOCUMENTS

DE 10 2016 208 210 A1 11/2017
JP 2007-65147 A 3/2007
(Continued)

*Primary Examiner* — Stephone B Allen
*Assistant Examiner* — Boutsikaris Leonidas
(74) *Attorney, Agent, or Firm* — Birch, Stewart, Kolasch & Birch, LLP

(57) ABSTRACT

The present disclosure relates to a prism apparatus, and a camera apparatus including the same. The prism apparatus according to an embodiment of the present disclosure may include: a prism configured to reflect input light toward a first reflected direction; a first actuator configured to change an angle of the prism about a first rotation axis to change the first reflected direction based on a first control signal; a lens configured to output the light reflected by the prism toward a second reflected direction; and a second actuator configured to change an angle of the lens about a second rotation axis to change the second reflected direction based on a second control signal. Accordingly, it is possible to implement the optical image stabilization (OIS) for the prism.

18 Claims, 40 Drawing Sheets

(58) Field of Classification Search
USPC .................................................. 359/557, 555
See application file for complete search history.

(56) References Cited

U.S. PATENT DOCUMENTS

| | | | |
|---|---|---|---|
| 2018/0024329 A1* | 1/2018 | Goldenberg | ............ H04N 23/45 |
| 2018/0217475 A1 | 8/2018 | Goldenberg et al. | |
| 2018/0224633 A1 | 8/2018 | Wu et al. | |
| 2020/0218082 A1* | 7/2020 | Choi | ....................... G03B 17/17 |
| 2021/0026117 A1* | 1/2021 | Yao | ....................... G02B 13/004 |
| 2021/0266465 A1* | 8/2021 | Wang | ...................... H04N 23/55 |
| 2021/0389547 A1* | 12/2021 | Karam | ...................... G02B 3/14 |
| 2022/0187615 A1* | 6/2022 | Xia | ....................... G02B 26/004 |

FOREIGN PATENT DOCUMENTS

| | | |
|---|---|---|
| JP | 2015-79086 A | 4/2015 |
| JP | 2016-51046 A | 4/2016 |
| KR | 10-2010-0087629 A | 8/2010 |
| KR | 10-2015-0097766 A | 8/2015 |
| KR | 10-2018-0041040 A | 4/2018 |
| KR | 10-1901705 B1 | 9/2018 |
| KR | 10-2018-0114801 A | 10/2018 |
| WO | WO 2018/194195 A1 | 10/2018 |

* cited by examiner (a)

500
V1

(b)

500
V2>V1

(c)

500
V3>V2

PRISM APPARATUS AND CAMERA APPARATUS INCLUDING THE SAME

CROSS REFERENCE TO RELATED APPLICATIONS

This application is the National Stage filing under 35 U.S.C. 371 of International Application No. PCT/KR2019/015188, filed on Nov. 8, 2019, which claims the benefit of earlier filing date and right of priority to Korean Application No. 10-2018-0137510, filed on Nov. 9, 2018, the contents of all these applications are hereby incorporated by reference herein in their entirety.

BACKGROUND OF THE DISCLOSURE

1. Field of the Disclosure

The present disclosure relates to a prism apparatus, and a camera apparatus including the same, and more particularly, to a prism apparatus capable of performing optical image stabilization (OIS) for compensating for prism movement caused by hand tremble, and a camera apparatus including the prism apparatus.

2. Description of the Related Art

A camera is an apparatus for photographing an image. Recently, as a camera is employed in a mobile terminal, the research on the downsizing of a camera has been progressed.

Meanwhile, in addition to the downsizing trend of the camera, an auto focus function and an optical image stabilization (OIS) function are adopted.

Particularly, for performing optical image stabilization (OIS) function, it is important to accurately detect and compensate movement of prism caused by hand tremble.

SUMMARY

It is an object of the present disclosure to provide a prism apparatus capable of performing optical image stabilization (OIS) for compensating for prism movement caused by hand tremble, and a camera apparatus including the prism apparatus.

It is another object of the present disclosure to provide a prism apparatus capable of performing optical image stabilization (OIS) by independently rotating a prism, and a camera apparatus including the prism apparatus.

It is yet another object of the present disclosure to provide a prism apparatus including a prism, and a camera apparatus including the prism apparatus.

In accordance with an aspect of the present disclosure, the above and other objects can be accomplished by providing a prism apparatus and a camera apparatus including the same, the prism apparatus including: a prism configured to reflect input light toward a first reflected direction; a first actuator configured to change an angle of the prism about a first rotation axis to change the first reflected direction based on a first control signal; a lens configured to output the light reflected by the prism toward a second reflected direction; and a second actuator configured to change an angle of the lens about a second rotation axis to change the second reflected direction based on a second control signal.

Meanwhile, in the prism apparatus and the camera apparatus including the same, the prism apparatus may further include a frame in which the lens is mounted, wherein the second actuator may include a first driving device and a second driving device connected to both ends of the frame, and may change the second reflected direction by moving at least one of the first driving device and the second driving device.

Meanwhile, the lens may include a liquid lens, wherein by applying an electrical signal to the liquid lens, the second actuator may change a curvature of the liquid lens.

Meanwhile, the first rotation axis of the prism may be perpendicular to the second rotation axis of the lens.

Meanwhile, in response to a movement causing rotation of the prism about the first rotation axis by a first angle and rotation of the lens about the second rotation axis by a second angle, the first actuator may be configured to rotate the prism in a third direction opposite the first direction by a third angle in response to the first control signal; and the second actuator may be configured to rotate the lens in a fourth direction opposite the second direction by a fourth angle in response to the second control signal.

Meanwhile, in the prism apparatus and the camera apparatus including the same, the prism apparatus may further include: a first hall sensor configured to sense an angle change of the prism based on a first magnetic field; and a second hall sensor configured to sense an angle change of the lens based on a second magnetic field.

Meanwhile, the first actuator may include a first drive magnet and a first drive coil.

Meanwhile, in the prism apparatus and the camera apparatus including the same, the prism apparatus may further include: a prism holder configured to secure the prism; a first yoke coupled to a rear of the prism holder; the first drive magnet coupled to a rear of the first yoke; a first coil holder including a plurality of protrusions protruding toward the prism holder, each of the plurality of protrusions having an opening, and the openings of the plurality of protrusions defining the first rotation axis, wherein the first drive coil may be disposed between the first coil holder and the first yoke; and the prism holder may include a plurality of bosses configured to engage with the openings of the plurality of protrusions to allow rotation of the prism about the first prism axis.

Meanwhile, the second actuator may include a second drive magnet.

Meanwhile, a refractive index of the prism may be desirably 1.7 or greater.

Meanwhile, the second actuator may include: a lens driver configured to apply the electrical signal to the liquid lens; and a sensor device configured to sense a curvature of the liquid lens formed based on the electrical signal.

Meanwhile, the sensor device may be configured to sense a size of an area, or a change in the area, of a boundary region between an insulator on an electrode in the liquid lens and an electroconductive aqueous solution.

Meanwhile, in response to the size of the area or the change in the area, of the boundary region between the insulator on the electrode in the liquid lens and the electroconductive aqueous solution, the sensor device may be configured to sense capacitance formed by the electroconductive aqueous solution and the electrode.

Meanwhile, the second actuator may further include: a plurality of conductive lines provided for delivering a plurality of electrical signals, output from the lens driver, to the liquid lens; and a switching element disposed between any one of the plurality of conductive lines and the sensor device.

Meanwhile, the second actuator may further include a processor configured to calculate a curvature of the liquid lens based on the capacitance sensed by the sensor, and to output a pulse width modulation signal to the lens driver based on the calculated curvature and a target curvature.

Meanwhile, in response to the calculated curvature being less than the target curvature, the processor may increase a duty cycle of the pulse width modulation signal.

In accordance with another aspect of the present disclosure, the above and other objects can be accomplished by providing a prism apparatus and a camera apparatus including the same, the prism apparatus including: a lens configured to output input light toward a first reflected direction; a first actuator configured to change an angle of the lens about a first rotation axis to change the first reflected direction based on a first control signal; a prism configured to reflect the light output by the lens toward a second reflected direction; and a second actuator configured to change an angle of the prism about a second rotation axis to change the second reflected direction based on a second control signal.

Meanwhile, in a camera apparatus according to an embodiment of the present disclosure, an image sensor may receive light corresponding to an object being photographed from the prism apparatus while the image sensor is positioned perpendicularly to the object being photographed.

Meanwhile, one or more of the plurality of lenses may be moved along an axis for achieving variable focus, and the axis may be desirably perpendicular to a direction of the input light which is input into the prism apparatus.

Effects of the Disclosure

In accordance with an aspect of the present disclosure, a prism apparatus and a camera apparatus including the same may include: a prism configured to reflect input light toward a first reflected direction; a first actuator configured to change an angle of the prism about a first rotation axis to change the first reflected direction based on a first control signal; a lens configured to output the light reflected by the prism toward a second reflected direction; and a second actuator configured to change an angle of the lens about a second rotation axis to change the second reflected direction based on a second control signal. Accordingly, it is possible to implement the optical image stabilization (OIS) for the prism. Particularly, the optical image stabilization (OIS) can be implemented based on a plurality of rotation axes by independently rotating the prism. In addition, since the optical paths of the prism and the lens are different from each other, a slim camera having a reduced thickness may be provided.

Meanwhile, the prism apparatus and the camera apparatus including the same may further include a frame in which the lens is mounted, wherein the second actuator may include a first driving device and a second driving device connected to both ends of the frame, and may change the second reflected direction by moving at least one of the first driving device and the second driving device. Accordingly, it is possible to implement the optical image stabilization (OIS) for the prism based on the second rotation axis.

Meanwhile, the lens may include a liquid lens, wherein by applying an electrical signal to the liquid lens, the second actuator may change a curvature of the liquid lens. Accordingly, it is possible to implement the optical image stabilization (OIS) for the prism based on the second rotation axis.

Meanwhile, the first rotation axis of the prism may be perpendicular to the second rotation axis of the lens. Accordingly, it is possible to implement the optical image stabilization (OIS) for the prism based on the plurality of rotation axes.

Meanwhile, in response to a movement causing rotation of the prism about the first rotation axis by a first angle and rotation of the lens about the second rotation axis by a second angle, the first actuator may be configured to rotate the prism in a third direction opposite the first direction by a third angle in response to the first control signal; and the second actuator may be configured to rotate the lens in a fourth direction opposite the second direction by a fourth angle in response to the second control signal. Accordingly, the compensation angle in the optical image stabilization (OIS) becomes small, so that the accuracy of the optical image stabilization (OIS) can be improved.

Meanwhile, the prism apparatus and the camera apparatus including the same may further include: a first hall sensor configured to sense an angle change of the prism based on a first magnetic field; and a second hall sensor configured to sense an angle change of the lens based on a second magnetic field. Accordingly, it is possible to implement the optical image stabilization (OIS) for the prism.

Meanwhile, the first actuator may include a first drive magnet and a first drive coil. Accordingly, it is possible to implement the optical image stabilization (OIS) for the prism based on the first rotation axis.

Meanwhile, the prism apparatus and the camera apparatus including the same may further include: a prism holder configured to secure the prism; a first yoke coupled to a rear of the prism holder; the first drive magnet coupled to a rear of the first yoke; a first coil holder including a plurality of protrusions protruding toward the prism holder, each of the plurality of protrusions having an opening, and the openings of the plurality of protrusions defining the first rotation axis, wherein the first drive coil may be disposed between the first coil holder and the first yoke; and the prism holder may include a plurality of bosses configured to engage with the openings of the plurality of protrusions to allow rotation of the prism about the first prism axis. Accordingly, it is possible to implement the optical image stabilization (OIS) for the prism based on the first rotation axis.

Meanwhile, the second actuator may include a second drive magnet. Accordingly, it is possible to implement the optical image stabilization (OIS) for the prism based on the second rotation axis.

Meanwhile, a refractive index of the prism may be desirably 1.7 or greater. Accordingly, total reflection can be performed in the prism and the lens, and thus, light can be transmitted in the direction of the image sensor.

Meanwhile, the second actuator may include: a lens driver configured to apply the electrical signal to the liquid lens; and a sensor device configured to sense a curvature of the liquid lens formed based on the electrical signal. Accordingly, the liquid lens may be simply driven. Particularly, the curvature of the liquid lens may be simply calculated.

Meanwhile, the sensor device may be configured to sense a size of an area, or a change in the area, of a boundary region between an insulator on an electrode in the liquid lens and an electroconductive aqueous solution. Accordingly, the curvature of the liquid lens may be simply calculated.

Meanwhile, in response to the size of the area or the change in the area, of the boundary region between the insulator on the electrode in the liquid lens and the electroconductive aqueous solution, the sensor device may be configured to sense capacitance formed by the electroconductive aqueous solution and the electrode. Accordingly, the curvature of the liquid lens may be simply calculated.

Meanwhile, the second actuator may further include: a plurality of conductive lines provided for delivering a plurality of electrical signals, output from the lens driver, to the liquid lens; and a switching element disposed between any one of the plurality of conductive lines and the sensor device. Accordingly, the curvature of the liquid lens may be simply calculated.

Meanwhile, the second actuator may further include a processor configured to calculate a curvature of the liquid lens based on the capacitance sensed by the sensor, and to output a pulse width modulation signal to the lens driver based on the calculated curvature and a target curvature. Accordingly, the curvature of the liquid lens may be simply calculated.

Meanwhile, in response to the calculated curvature being less than the target curvature, the processor may increase a duty cycle of the pulse width modulation signal. Accordingly, a target curvature of the liquid lens may be achieved.

In accordance with another aspect of the present disclosure, a prism apparatus and a camera apparatus including the same may include: a lens configured to output input light toward a first reflected direction; a first actuator configured to change an angle of the lens about a first rotation axis to change the first reflected direction based on a first control signal; a prism configured to reflect the light output by the lens toward a second reflected direction; and a second actuator configured to change an angle of the prism about a second rotation axis to change the second reflected direction based on a second control signal. Accordingly, it is possible to implement the optical image stabilization (OIS) for the prism. Particularly, the optical image stabilization (OIS) can be implemented based on a plurality of rotation axes by independently rotating the prism. In addition, since the optical paths of the prism and the lens are different from each other, a slim camera having a reduced thickness may be provided.

Meanwhile, in a camera apparatus according to an embodiment of the present disclosure, an image sensor may receive light corresponding to an object being photographed from the prism apparatus while the image sensor is positioned perpendicularly to the object being photographed. Accordingly, a slim camera having a reduced thickness may be provided.

Meanwhile, one or more of the plurality of lenses may be moved along an axis for achieving variable focus, and the axis may be desirably perpendicular to a direction of the input light which is input into the prism apparatus. Accordingly, a slim camera having a reduced thickness may be provided.

BRIEF DESCRIPTION OF THE DRAWINGS

The objects, features and advantages of the present disclosure will be more apparent from the following detailed description in conjunction with the accompanying drawings, in which.

DETAILED DESCRIPTION OF THE PREFERRED EMBODIMENTS

Hereinafter, the present disclosure will be described in detail with reference to the accompanying drawings. With respect to constituent elements used in the following description, suffixes "module" and "unit" are given only in consideration of ease in the preparation of the specification, and do not have or serve as different meanings. Accordingly, the suffixes "module" and "unit" may be used interchangeably.

Figure 1A:
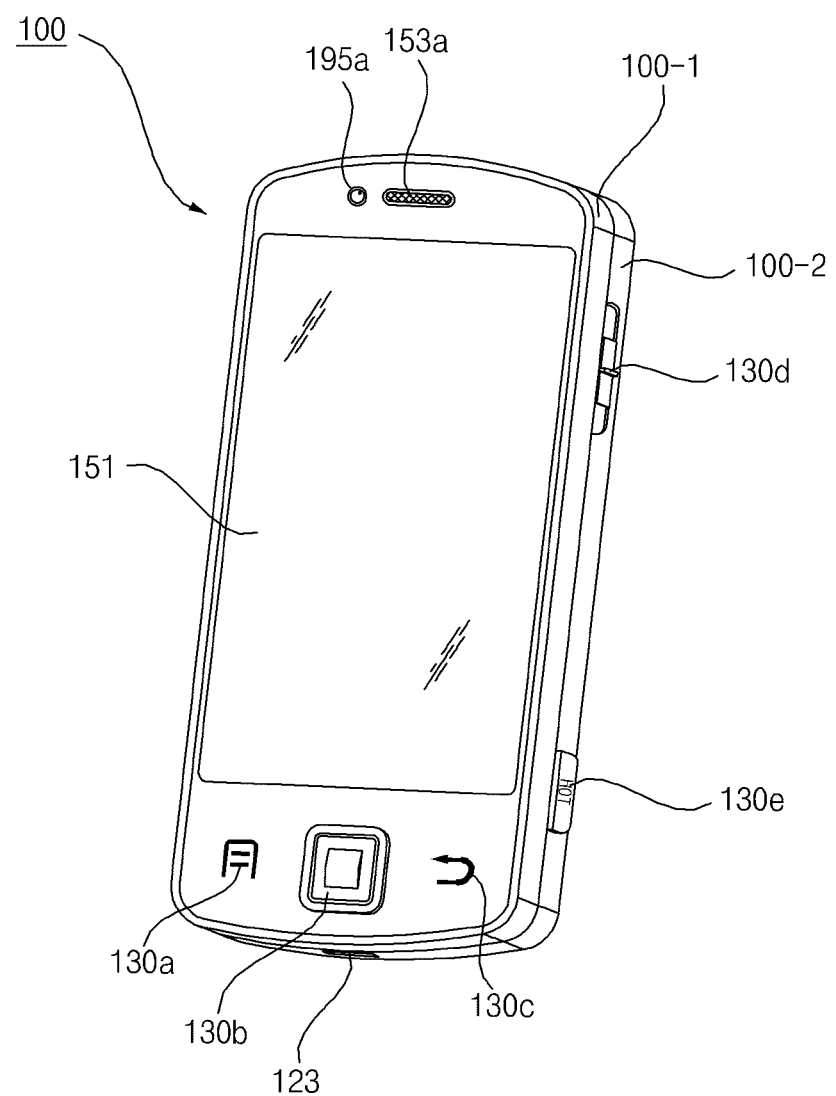
FIG. 1A is a perspective view of a mobile terminal as an example of an image display apparatus according to an embodiment of the present disclosure.
Figure 1B:
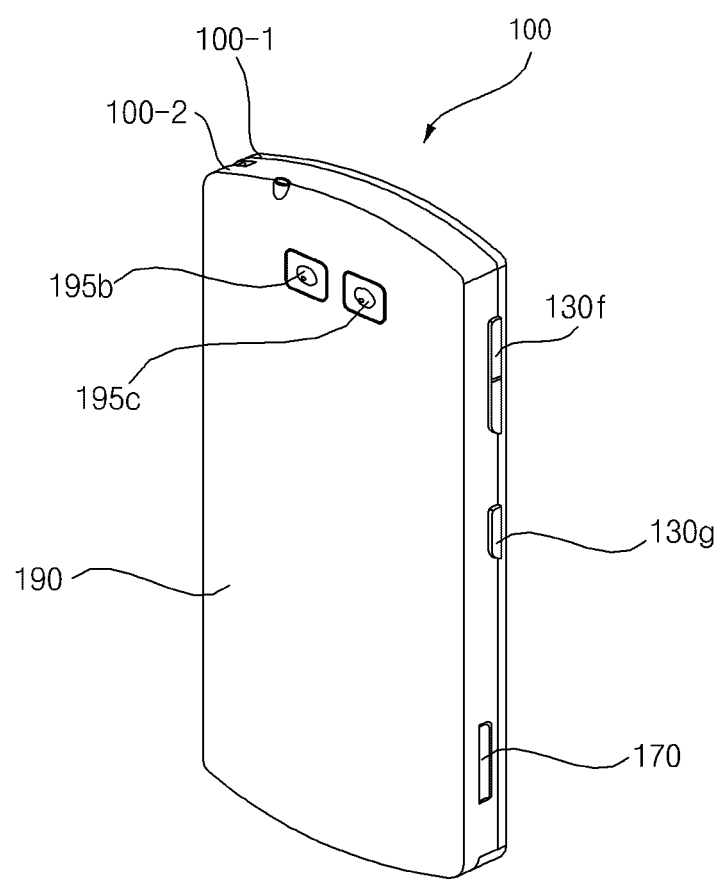
FIG. 1B is a rear perspective view of the mobile terminal shown in FIG. 1A.

FIG. 1A is a perspective view of a mobile terminal as an example of an image display apparatus according to an embodiment of the present disclosure, and FIG. 1B is a rear perspective view of the mobile terminal shown in FIG. 1A.

Referring to FIG. 1A, a case forming an outer appearance of a mobile terminal 100 may be formed by a front case 100-1 and a rear case 100-2. Various electronic components may be embedded in a space formed by the front case 100-1 and the rear case 100-2.

Specifically, a display 180, a first sound output module 153*a*, a first camera 195*a*, and a first to third user input devices 130*a*, 130*b*, and 130*c* may be disposed in the front case 100-1. Further, a fourth user input device 130*d*, a fifth user input device 130*e*, and a first to third microphones 123*a*, 123*b*, and 123*c* may be disposed on a lateral surface of the rear case 100-2.

In the display 180, a touchpad may be overlapped in a layer structure so that the display 180 may operate as a touch screen.

The first sound output module 153*a* may be implemented in the form of a receiver or a speaker. The first camera 195*a* may be implemented in a form suitable for photographing an image or a moving image of a user, and the like. The microphone 123 may be implemented in a form suitable for receiving a user's voice, other sounds, and the like.

The first to fifth user input devices 130*a*, 130*b*, 130*c*, 130*d* and 130*e* and the sixth and seventh user input devices 130*f* and 130*g* described below may be collectively referred to as a user input device 130.

The first microphone 123*a* and the second microphone 123*b* may be disposed in the upper side of the rear case 100-2, i.e., in the upper side of the mobile terminal 100, so as to collect an audio signal, and the third microphone 123*c* may be disposed in the lower side of the rear case 100-2, i.e., in the lower side of the mobile terminal 100, so as to collect an audio signal Referring to FIG. 1B, a second camera 195*b*, a third camera 195*c*, and a fourth microphone (not shown) may be additionally mounted on the rear surface of the rear case 100-2, and a sixth and seventh user input devices 130*f* and 130*g*, and an interface 175 may be disposed on the side surface of the rear case 100-2.

The second camera 195*b* may have a photographing direction substantially opposite to that of the first camera 195*a*, and may have different pixels from the first camera 195*a*. A flash (not shown) and a mirror (not shown) may be additionally disposed adjacent to the second camera 195*b*. In addition, another camera may be installed adjacent to the second camera 195*b* to be used for photographing a three-dimensional stereoscopic image.

A second sound output module (not shown) may be additionally disposed in the rear case 100-2. The second sound output module may implement a stereo function together with the first sound output module 153*a*, and may be used for talking in a speakerphone mode.

A power supply 190 for supplying power to the mobile terminal 100 may be mounted in the rear case 100-2. The power supply 190 may be, for example, a rechargeable battery and may be detachably coupled to the rear case 100-2 for charging or the like.

The fourth microphone 123*d* may be disposed in the front surface of the rear case 100-2, i.e., in the rear surface of the mobile terminal 100 so as to collect an audio signal.

Figure 2:
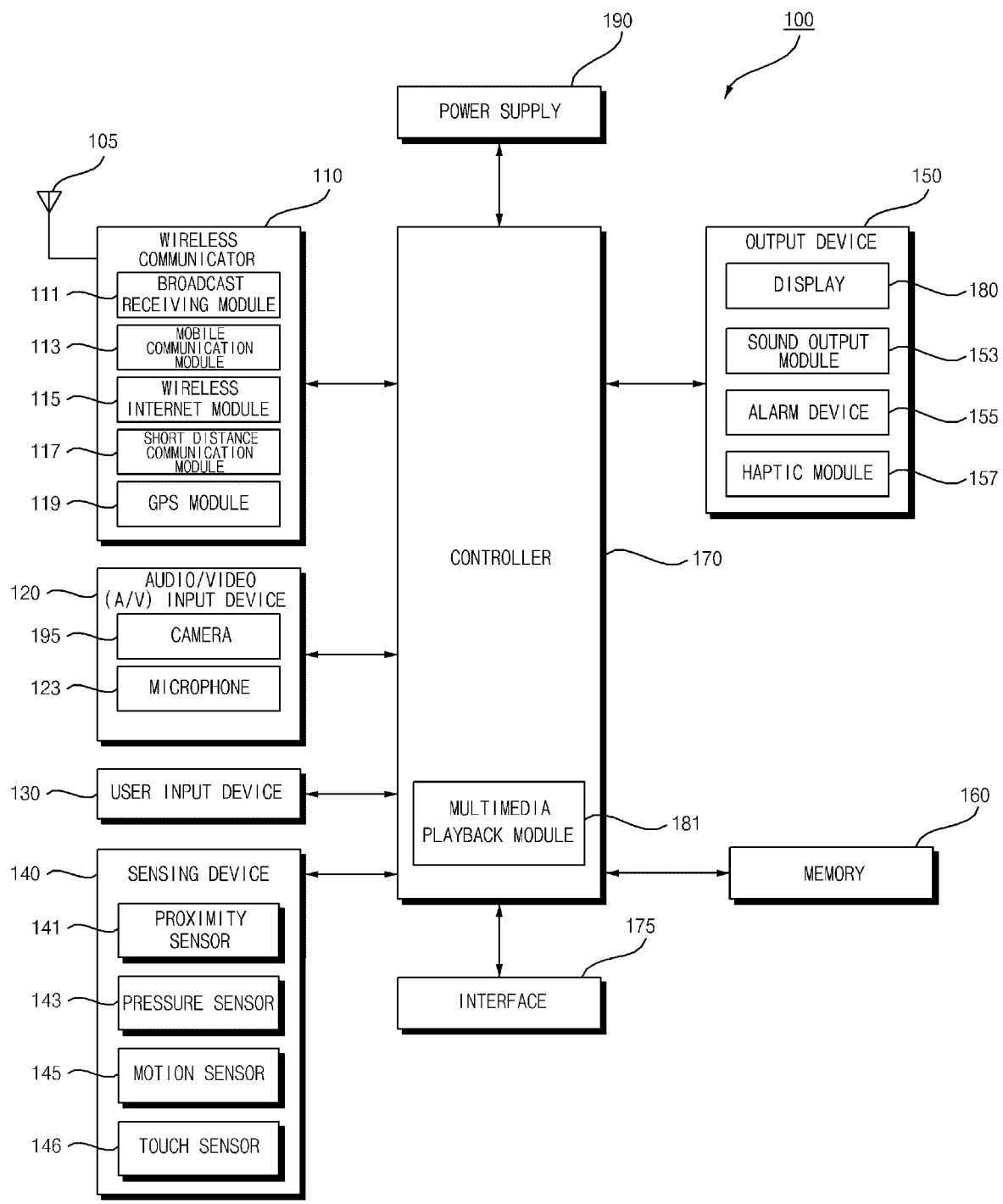
FIG. 2 is a block diagram of the mobile terminal of FIG. 1.

FIG. 2 is a block diagram of the mobile terminal of FIG. 1.

Referring to FIG. 2, the mobile terminal 100 may include a wireless communicator 110, an audio/video (A/V) input device 120, a user input device 130, a sensing device 140, an output device 150, a memory 160, an interface 175, a controller 170, and a power supply 190. When these components are implemented in an actual application, two or more components may be combined into one component if necessary, or one component may be divided into two or more components.

The wireless communicator 110 may include a broadcast receiving module 111, a mobile communication module 113, a wireless Internet module 115, a short distance communication module 117, and a GPS module 119.

The broadcast receiving module 111 may receive at least one of a broadcast signal and broadcast related information from an external broadcast management server through a broadcast channel. The broadcast signal and/or broadcast related information received through the broadcast receiving module 111 may be stored in the memory 160.

The mobile communication module 113 may transmit and receive a wireless signal to at least one of a base station, an external terminal, and a server on a mobile communication network. Here, the wireless signal may include various types of data in accordance with a voice call signal, a video call signal, or a character/multimedia message transmission/reception.

The wireless Internet module 115 refers to a module for wireless Internet access, and the wireless Internet module 115 may be embedded in the mobile terminal 100 or externally provided.

The short distance communication module 117 refers to a module for short distance communication. Bluetooth, Radio Frequency Identification (RFID), infrared Data Association (IrDA), Ultra Wideband (UWB), ZigBee, and Near Field Communication (NFC) may be used as a short distance communication technology.

The Global Position System (GPS) module 119 may receive position information from a plurality of GPS satellites.

The audio/video (A/V) input device 120 may be used to input an audio signal or a video signal, and may include the camera 195, the microphone 123, and the like.

The camera 195 may process an image frame such as a still image or a moving image obtained by an image sensor in a video call mode or a photographing mode. Then, the processed image frame may be displayed on the display 180.

The image frame processed by the camera 195 may be stored in the memory 160 or transmitted to the outside through the wireless communicator 110. Two or more cameras 195 may be provided according to the configuration of the terminal.

The microphone 123 may receive an external audio signal by the microphone in a display off mode, e.g., a call mode, a recording mode, or a voice recognition mode, and may process the audio signal into an electrical voice data.

Meanwhile, a plurality of microphones 123 may be disposed in different positions. The audio signal received in each microphone may be audio-signal processed in the controller 170, or the like.

The user input device 130 may generate key input data that the user inputs for controlling the operation of the terminal. The user input device 130 may include a key pad, a dome switch, and a touch pad (static pressure scheme/capacitive scheme) capable of receiving a command or information by a user's pressing or touching operation. In particular, when the touch pad has a mutual layer structure with the display 180 described later, it may be referred to as a touch screen.

The sensing device 140 may detect the current state of the mobile terminal 100 such as the open/close state of the mobile terminal 100, the position of the mobile terminal 100, the contact of the user, and the like, and may generate a sensing signal for controlling the operation of the mobile terminal 100.

The sensing device 140 may include a proximity sensor 141, a pressure sensor 143, a motion sensor 145, a touch sensor 146, and the like.

The proximity sensor 141 may detect an object approaching the mobile terminal 100 or an object in the vicinity of the mobile terminal 100 without mechanical contact. In particular, the proximity sensor 141 may detect a nearby object by using a change in the alternating magnetic field or a change in the static magnetic field, or by using a change rate of the capacitance.

The pressure sensor 143 may detect whether a pressure is applied to the mobile terminal 100, or detect the magnitude of the pressure, and the like.

The motion sensor 145 may detect the position or motion of the mobile terminal 100 by using an acceleration sensor, a gyro sensor, or the like.

The touch sensor 146 may detect a touch input by a user's finger or a touch input by a specific pen. For example, when a touch screen panel is disposed on the display 180, the touch screen panel may include a touch sensor 146 for detecting position information and intensity information of the touch input. A sensing signal detected by the touch sensor 146 may be transmitted to the controller 180.

The output device 150 may be used to output an audio signal, a video signal, or an alarm signal. The output device 150 may include a display 180, an sound output module 153, an alarm device 155, and a haptic module 157.

The display 180 may display and output information processed by the mobile terminal 100. For example, when the mobile terminal 100 is in the call mode, a user interface (UI) or graphic user interface (GUI) related with the call may be displayed. When the mobile terminal 100 is in the video call mode or the photographing mode, the photographed or received image may be displayed individually or simultaneously, and the UI and the GUI may be displayed.

Meanwhile, as described above, when the display 180 and the touch pad form a mutual layer structure to constitute a touch screen, the display 180 may be used as an input apparatus capable of inputting information by a user's touch in addition to an output apparatus.

The sound output module 153 may output the audio data received from the wireless communicator 110 or stored in the memory 160 in a call signal reception, a call mode or a recording mode, a voice recognition mode, a broadcast reception mode, and the like. The sound output module 153 may output an audio signal related to the function performed in the mobile terminal 100, e.g., a call signal reception tone, a message reception tone, and the like. The sound output module 153 may include a speaker, a buzzer, and the like.

The alarm device 155 may output a signal for notifying the occurrence of an event of the mobile terminal 100. The alarm device 155 may output a signal for notifying the occurrence of an event in a form other than an audio signal or a video signal. For example, it is possible to output a signal in a form of vibration.

The haptic module 157 may generate various tactile effects that the user can feel. A typical example of the tactile effect generated by the haptic module 157 may be a vibration effect. When the haptic module 157 generates vibration with a tactile effect, the intensity and pattern of the vibration generated by the haptic module 157 can be converted, and different vibrations may be synthesized and outputted or sequentially outputted.

The memory 160 may store a program for the processing and controlling of the controller 170, and may serve to temporarily store inputted or outputted data (e.g., a phone book, a message, a still image, a moving image, or the like).

The interface 175 may serve as an interface with all external devices connected to the mobile terminal 100. The interface 175 may receive data from an external device or receive power from the external device to transmit to each component in the mobile terminal 100, and allow the data in the mobile terminal 100 to be transmitted to the external device.

The controller 170 may control, in general, the operation of each unit to control the overall operation of the mobile terminal 100. For example, the controller 170 may perform relevant control and processing for voice call, data communication, video call, and the like. In addition, the controller 170 may include a multimedia play module 181 for playing multimedia. The multimedia play module 181 may be configured in hardware inside the controller 170 or may be configured in software separately from the controller 170. Meanwhile, the controller 170 may include an application processor (not shown) for driving an application. Alternatively, the application processor (not shown) may be provided separately from the controller 170.

The power supply 190 may receive external power or internal power under the control of the controller 170 to supply power required for operation of each component.

Figure 3A:
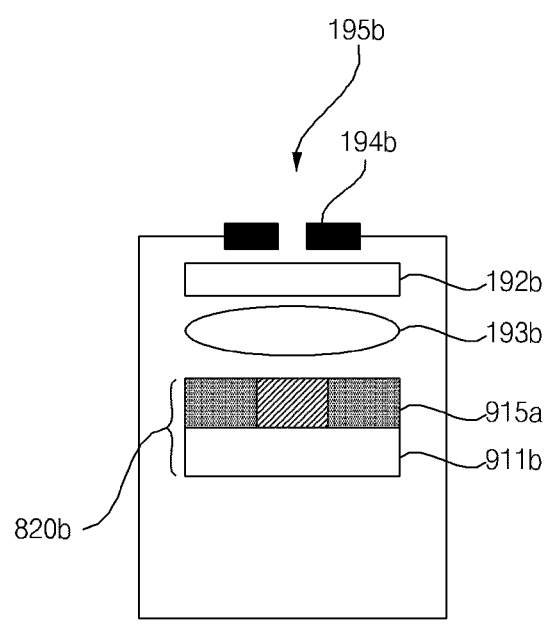
FIG. 3A is an internal cross-sectional view of the camera of FIG. 2.

FIG. 3A is an internal cross-sectional view of the camera of FIG. 2.

Referring to the drawing, FIG. 3A is an example of a cross-sectional view of a second camera 195b inside the camera 195.

The second camera 195b may include an aperture 194b, a prism apparatus 192b, a lens apparatus 193b, and an image sensor 820b.

The aperture 194b may open and close the light incident on the lens apparatus 193b.

The image sensor 820b may include an RGb filter 915b, and a sensor array 911b for converting an optical signal into an electric signal, in order to sense RGB colors.

Accordingly, the image sensor 820b may sense and output RGB images, respectively.

Figure 3B:
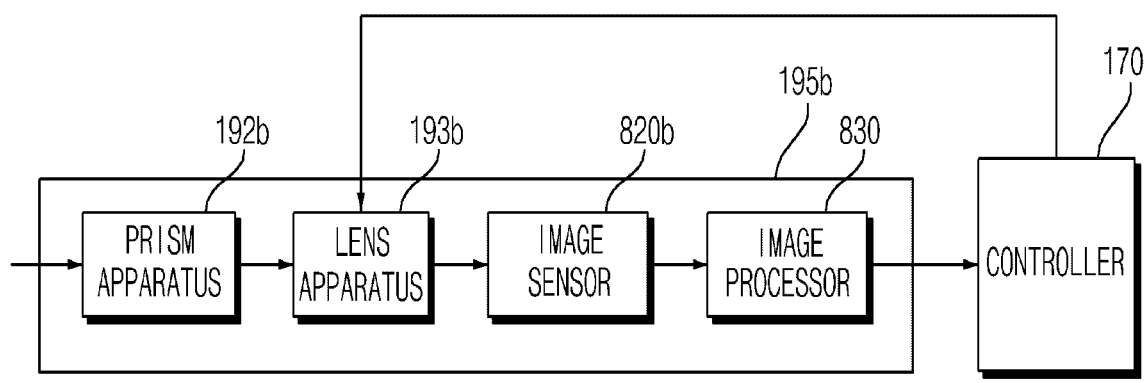
FIG. 3B is an internal block diagram of the camera of FIG. 2.

FIG. 3B is an internal block diagram of the camera of FIG. 2

Referring to the drawing, FIG. 3B is an example of a block diagram for the second camera 195b inside the camera 195.

The second camera 195b may include the prism apparatus 192b, the lens apparatus 193b, the image sensor 820b, and an image processor 830.

The image processor 830 may generate an RGB image based on an electrical signal from the image sensor 820b.

Meanwhile, the image sensor 820b may adjust an exposure time based on the electric signal.

Meanwhile, the RGB image from the image processor 830 may be transmitted to the controller 180 of the mobile terminal 100.

Meanwhile, the controller 180 of the mobile terminal 100 may output a control signal to the lens apparatus 193b for motion of a lens in the lens apparatus 193b. For example, a control signal for autofocusing may be output to the lens apparatus 193b.

Meanwhile, the controller 180 of the mobile terminal 100 may output a control signal for the optical image stabilization (OIS) function in the prism apparatus 192b to the prism apparatus 192b.

Figure 3C:
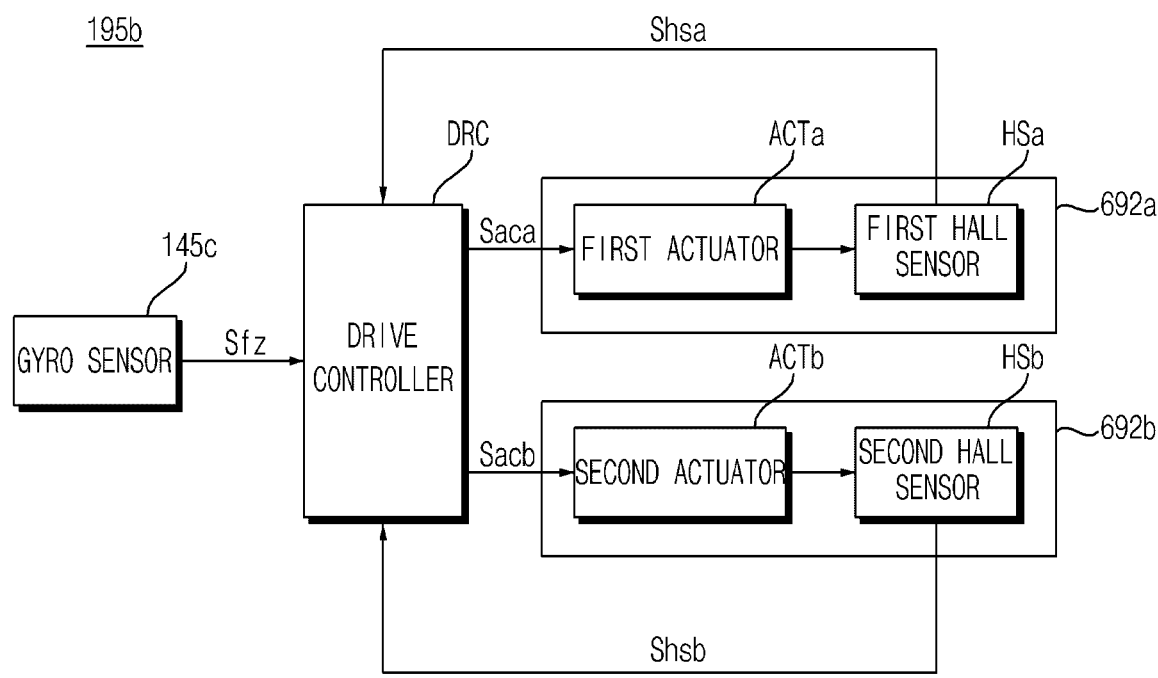
FIG. 3C and FIG. 3D are various examples of the internal block diagram of the camera of FIG. 2.
Figure 3D:
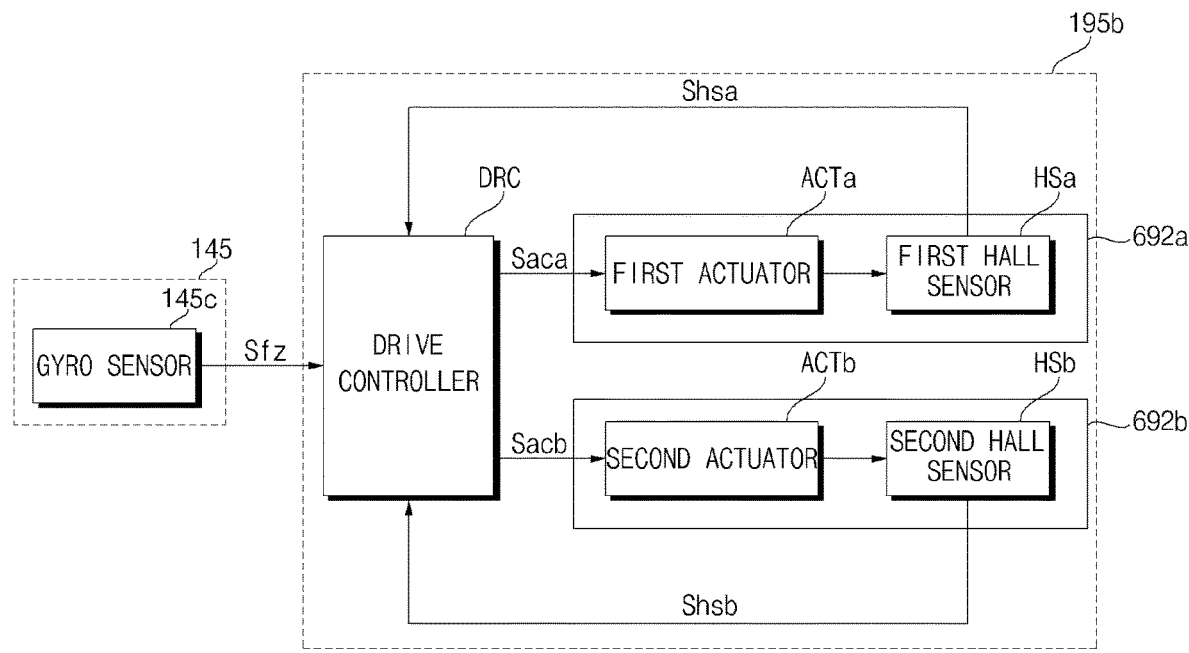

FIG. 3C and FIG. 3D are various examples of the internal block diagram of the camera of FIG. 2.

Firstly, FIG. 3C illustrates that a gyro sensor 145c, a drive controller DRC, a prism module 692a, and a lens module 692b are provided inside the camera 195b.

The gyro sensor 145c may detect a first direction motion and a second direction motion. The gyro sensor 145c may output motion information Sfz including the first direction motion and the second direction motion.

The drive controller DRC may output control signals Saca and Sacb for the motion compensation to a prism module 692a and a lens module 692b respectively, based on motion information Sfz including a first direction motion and a second direction motion from the gyro sensor 145c.

In particular, the drive controller DRC may output the control signal to a first actuator ACTa and a second actuator ACTb in the prism module 692a and the lens module 692b.

A first control signal Saca may be a control signal for the compensation of the first direction motion sensed by the gyro sensor 145c, and a second control signal Sacb may be a control signal for the compensation of the second direction motion sensed by the gyro sensor 145c.

The first actuator ACTa may change the angle of a prism PSMa based on a first rotation axis, based on the first control signal Saca.

The second actuator ACTb may change the angle of a lens LNS based on a second rotation axis, based on the second control signal Sacb.

Meanwhile, a first hall sensor HSa in the prism module 692a and a second hall sensor Hsb in the lens module 692b may sense the change of the magnetic field so as to check movement information due to the movement of the prism PSMa and the lens LNS.

Meanwhile, a first hall sensor HSa may sense an angle change of the prism PSMa caused by the movement based on a first magnetic field, and a second hall sensor Hsb may sense an angle change of the lens LNS caused by the movement based on a second magnetic field.

The motion information detected by the first hall sensor HSa and the second hall sensor Hsb, particularly, first and second magnetic field or change of the magnetic field information Shsa and Shsb, may be input to the DRC.

The drive controller DRC may perform a PI control or the like, based on the control signals Saca and Sacb for the motion compensation and the motion information, particularly, the first and second magnetic field or change of the magnetic field information Shsa and Shsb, thereby accurately controlling the motion of the prism PSMa and the lens LNS.

That is, the drive controller DRC may perform a closed loop by receiving the information Shsa and Shsb detected by the first hall sensor HSa and the second hall sensor Hsb, and can accurately control the motion of the prism PSMa and the lens LNS.

Next, although FIG. 3D is similar to FIG. 3C, there exists a difference in that the gyro sensor 145c is provided not in the camera 195b but in the motion sensor 145 of a separate sensing device 140 inside the mobile terminal 100.

Accordingly, although not shown in FIG. 3D, the camera 195b in FIG. 3D may further include an interface (not shown) for receiving a signal from an external gyro sensor 145c.

Meanwhile, the motion information Sfz including the first directional motion and the second direction motion received from the gyro sensor 145c may be input to the drive controller DRC. The operation of the drive controller may be the same as that of FIG. 3C.

Figure 4A:
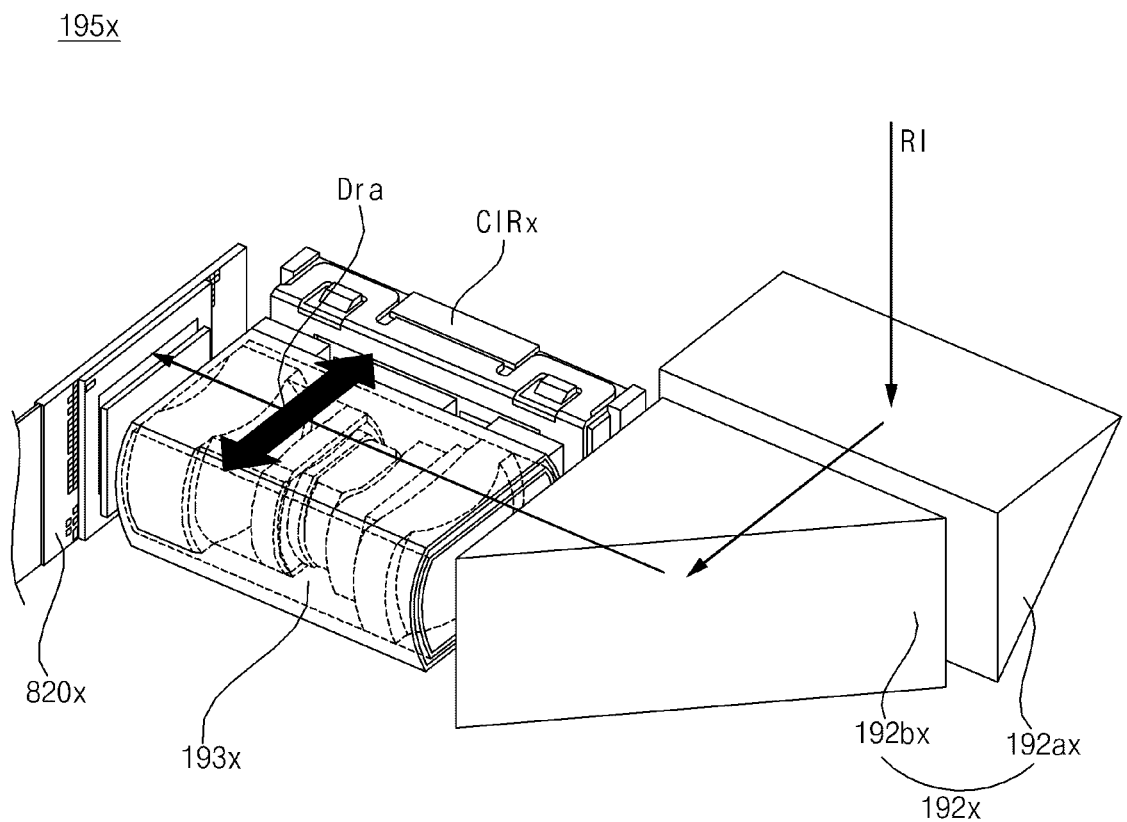
FIG. 4A is a diagram illustrating a camera having a prism apparatus.

FIG. 4A is a diagram illustrating a camera having a prism apparatus.

Referring to the drawing, a camera 195x of FIG. 4A may include an image sensor 820x, a lens apparatus 193x for transmitting light to the image sensor, a lens driver (CIRx) for moving a lens inside the lens apparatus 193x, and a prism apparatus 192bx having a first prism 192ax and a second prism 192bx.

The camera 195x of FIG. 4A may perform the movement of the lens apparatus 193x in order to perform optical image stabilization (OIS). In the drawing, it is illustrated that the compensation is performed in the Dra direction.

This method has a disadvantage that, when the optical zoom of the lens apparatus 193x is high, the optical image stabilization (OIS) should be performed more. Therefore, the accuracy of the optical image stabilization (OIS) may be reduced.

In addition, in this case, the lens movement direction should intersect with the Dra direction, so that it is difficult to simultaneously achieve the lens movement and the movement for performing optical image stabilization (OIS).

In the present disclosure, in order to compensate for this, it is assumed that the optical image stabilization (OIS) is implemented inside the prism apparatus, and the angle compensation is performed, in particular, by using a rotary actuator. According to this, by performing the angle compensation, there is an advantage that it is enough to compensate only an angle within a given range, regardless of whether the optical zoom of the lens apparatus 193x is low or high. For example, a plurality of prism apparatus may be used to compensate a first angle in first and second rotational axis directions, respectively. Accordingly, regardless of the optical zoom, since the angle compensation within a given range becomes possible, the accuracy of optical image stabilization (OIS) can be improved. This will be described with reference to FIG. 5A.

Figure 4B:
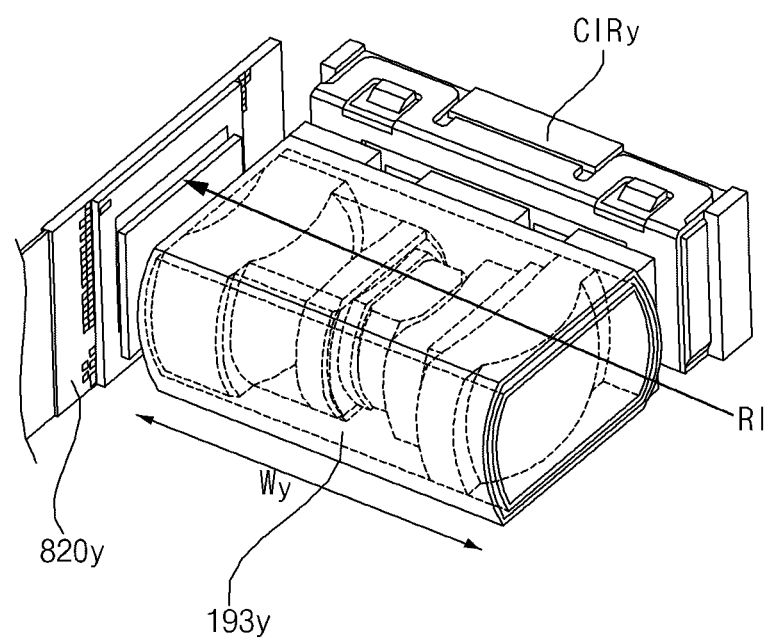
FIG. 4B and FIG. 4C are diagrams illustrating a camera in which a prism apparatus is omitted.
Figure 4C:
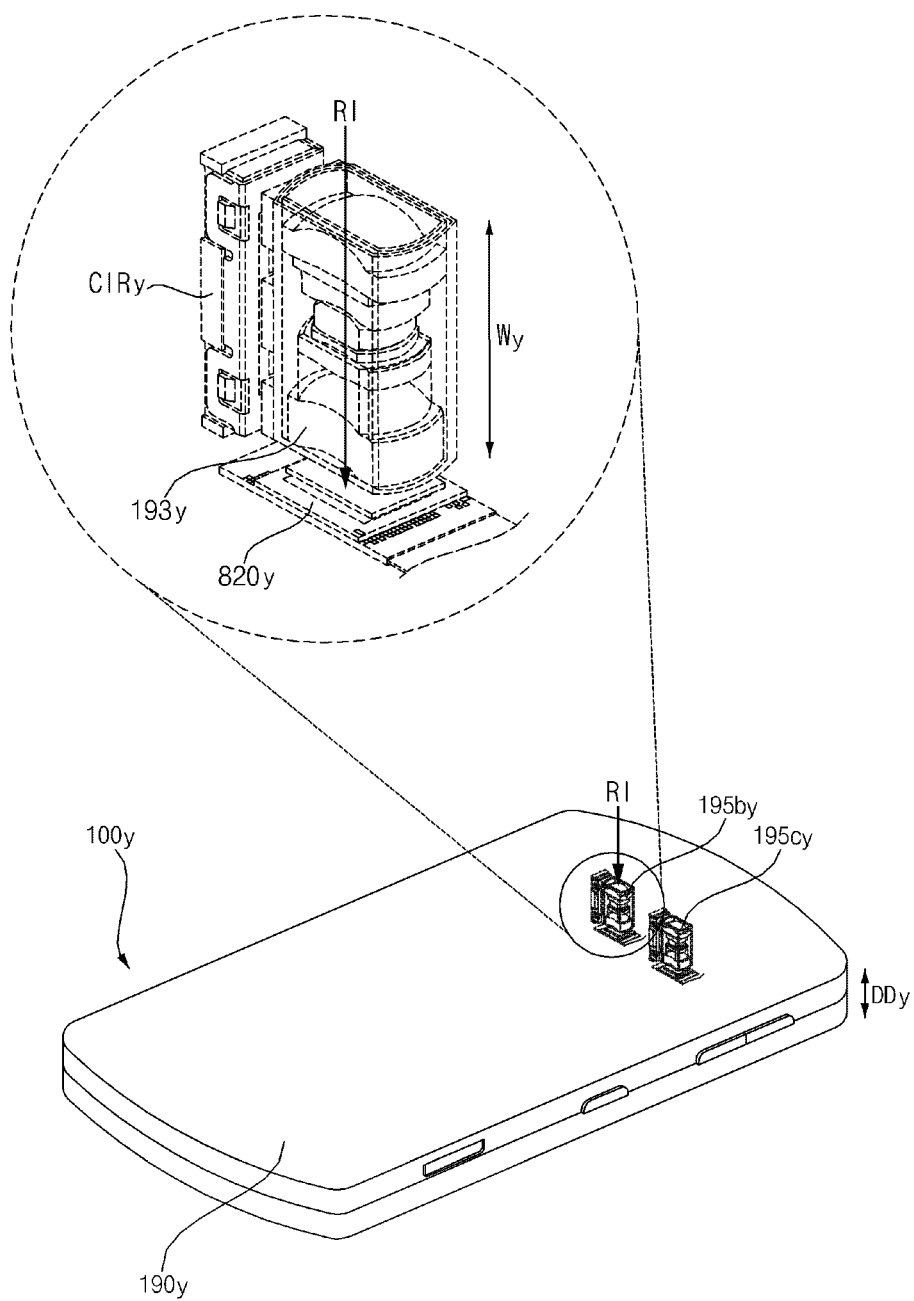

FIG. 4B and FIG. 4C are diagrams illustrating a camera in which a prism apparatus is omitted.

Referring to the drawing, a camera 195y of FIG. 4B may include an image sensor 820y, a lens apparatus 193y for transmitting light to the image sensor, and a lens driver (CIRx) for moving a lens inside the lens apparatus 193y.

Meanwhile, since the camera 195y of FIG. 4B does not have a plurality of prism apparatus, input light RI may be directly input through the lens apparatus 193y, so that the lens apparatus 193y and the image sensor 820y should be disposed perpendicular to the input light RI.

That is, in a mobile terminal 100y of FIG. 4C, input light RI may be transmitted to the image sensor 820y via the lens apparatus 193y.

Recently, the length Wy of the lens apparatus 193y increases according to the trend of high image quality and high performance. With this structure, there is a disadvantage that, as the length Wy of the lens apparatus 193y increases, the thickness DDy of the mobile terminal 100y becomes larger.

Accordingly, in order to solve this problem, in the present disclosure, a prism may be employed, and the first prism and the second prism may be disposed to intersect with each other such that the light (RI) path of the first prism and the light path of the second prism are different. According to this structure, it is possible to implement an L-type camera, and thus a slim camera having a reduced thickness can be implemented. This will be described with reference to FIG. 5A.

Figure 5A:
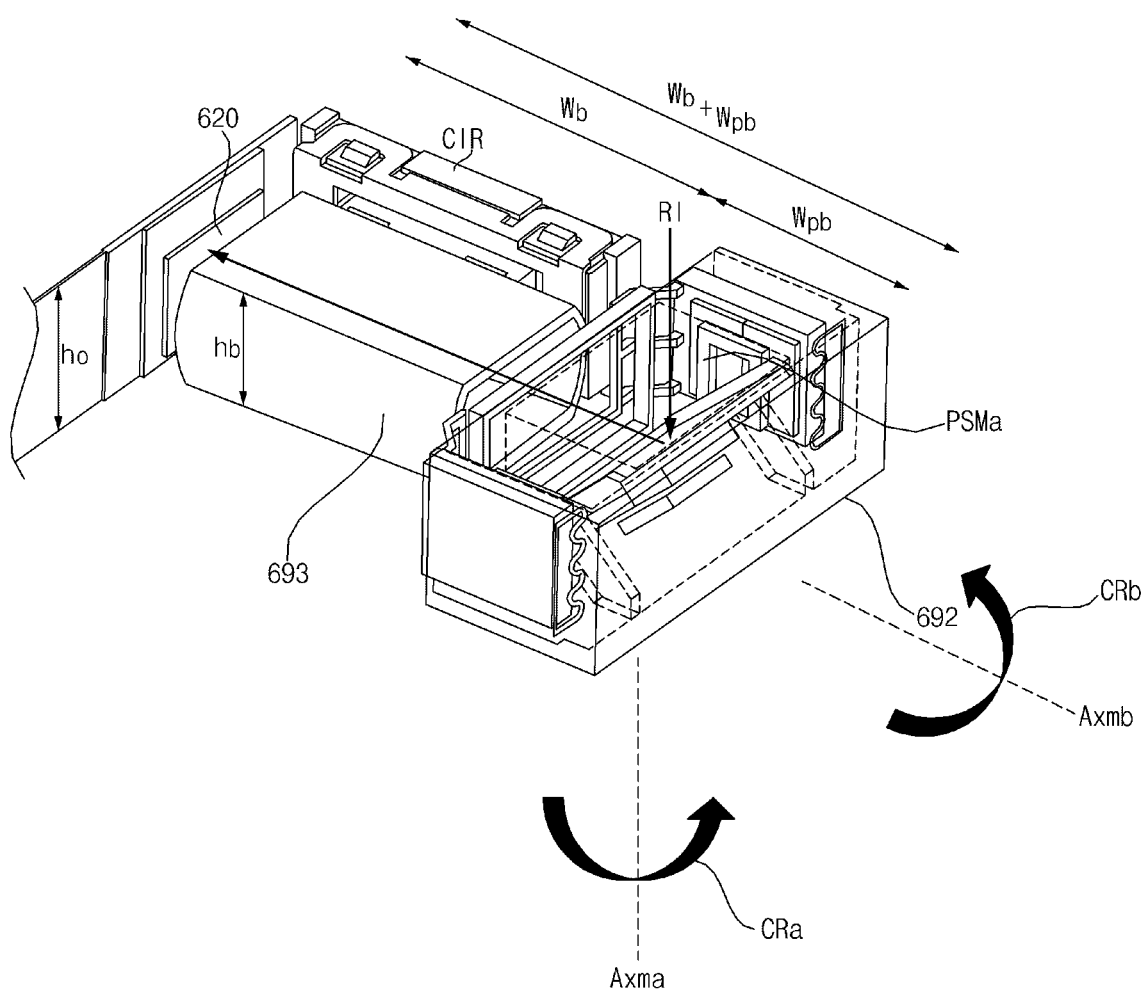
FIG. 5A is a diagram illustrating an example of a camera having a rotatable prism apparatus according to an embodiment of the present disclosure.
Figure 5B:
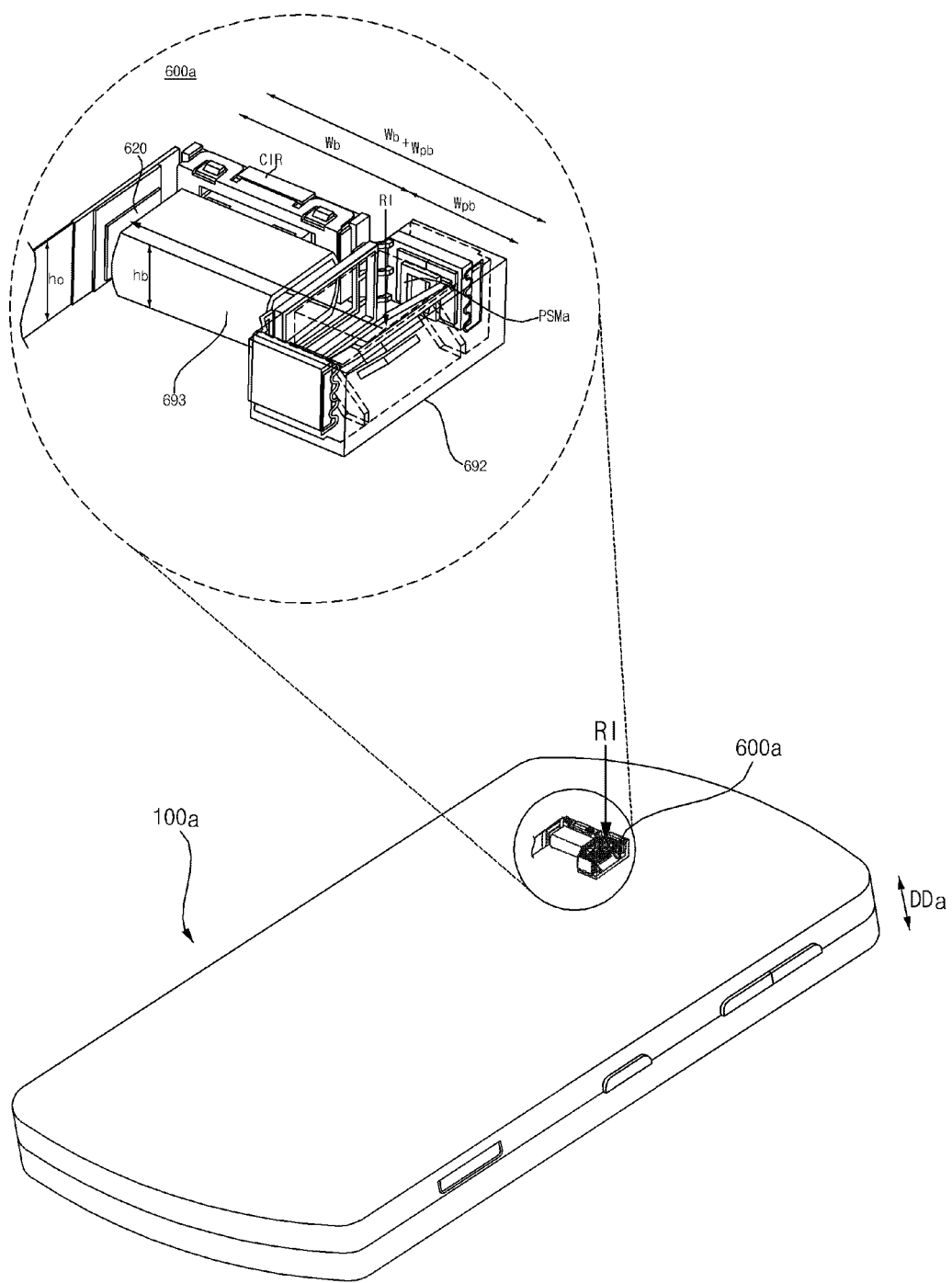
FIGS. 5B to 10 are diagrams referred to in the description of FIG. 5A.
Figure 5C:
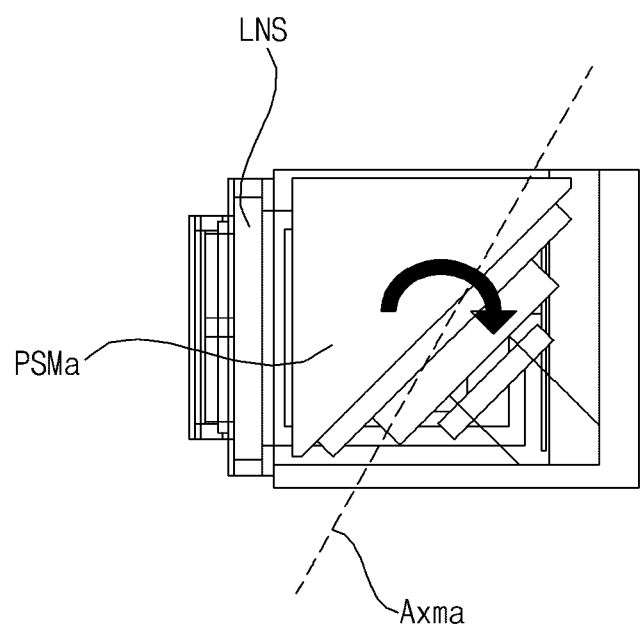
Figure 5D:
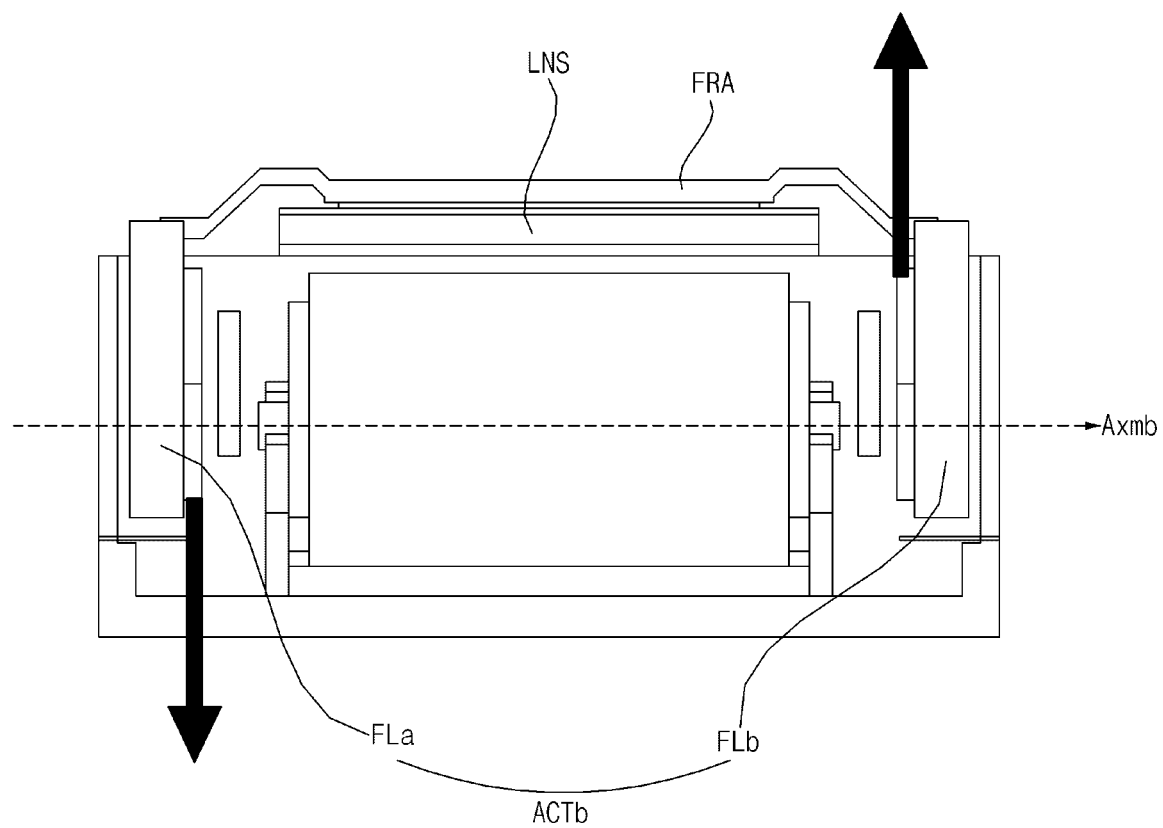

FIG. 5A is a diagram illustrating an example of a camera having a rotatable prism apparatus according to an embodiment of the present disclosure, and FIG. 5B is a diagram illustrating a mobile terminal having the camera of FIG. 5A Referring to the drawing, a camera 600a of FIG. 5A may include an image sensor 620, a lens apparatus 693 for transmitting light to the image sensor 620, and a prism apparatus 692 having a prism module 692a and a lens module 692b.

The prism apparatus 692 may differ from FIG. 4A in that it is rotated to achieve optical image stabilization (OIS) function.

Meanwhile, unlike FIG. 4A, since the lens apparatus 693 is not provided with an optical image stabilization (OIS) function, it can be implemented more slimly.

The lens apparatus 693 may have at least one lens, and the lens may be moved for variable focus.

For example, the lens apparatus 693 may be provided with a plurality of lenses such as a concave lens and a convex lens, and may move at least one of internal lenses so as to achieve variable focus, based on a control signal from the image processor 830 or the controller 180. In particular, it may be moved to the image sensor 820b or in a direction opposite to the image sensor 820b.

Meanwhile, FIG. 5A illustrates that the image sensor 620, the lens apparatus 693, and the prism apparatus 692 are sequentially arranged, and the light incident on the prism apparatus 692 is transmitted to the lens apparatus 693 and the image sensor 620. However, the present disclosure is not limited thereto.

Specifically, the light from the above may be reflected by an internal reflective surface RSa of the prism PSMa in the prism module 692a to be transmitted to the lens module 692b, and may be output through the lens LNS of the lens module 692b to be transmitted to the lens apparatus 693 and the image sensor 620.

That is, unlike FIG. 5A, the image sensor 620, the prism apparatus 692, and the lens apparatus 693 may be sequentially arranged, and the light incident on the lens apparatus 693 may be transmitted the prism apparatus 692 and the image sensor 620.

The prism apparatus 692 may include: a prism PSMa configured to reflect input light toward a first reflected direction; a first actuator ACTa configured to change an angle of the prism PSMa about a first rotation axis Axma to change the first reflected direction based on a first control signal Saca; a lens LNS configured to reflect the light reflected by the prism PSMa toward a second reflected direction; and a second actuator ACTb configured to change an angle of the lens LNS about a second rotation axis Axmb to change the second reflected direction based on a second control signal Sacb.

The prism PSMa may include an internal reflective surface RSa. Specifically, the prism PSMa may receive the input light through an entry prism surface Isa and may output the input light reflected from the internal reflective surface RSa through an exit prism surface OSa.

The exit prism surface OSa of the prism PSMa faces an entry surface of the lens LNS.

The first rotation axis Axma of the prism PSMa may be perpendicular to the second rotation axis Axmb of the lens LNS.

In this case, it is preferable that the prism PSMa and the lens LNS intersect with each other. In particular, it is preferable that the prism PSMa and the lens LNS are disposed perpendicular to each other.

Meanwhile, a refractive index of the prism PSMa may be 1.7 or more. Accordingly, a total reflection may be performed in the prism PSMa, and thus, the light RI can be transmitted toward the image sensor 620.

The refractive index of the prism PSMa may be less than 1.7, and a reflective coating may be formed on a reflective surface of the prism PSMa. Accordingly, a total reflection can be performed in the prism PSMa and thus, the light RI can be transmitted toward the image sensor.

In this case, the image sensor 620, the lens apparatus 693, and the prism module 692a may be disposed side by side in one direction.

The prism apparatus 692 may include the lens module 692b and the prism module 692a.

Unlike FIG. 4A, the prism apparatus 692 includes a single prism PSMA rather than a dual prism, thereby achieving a slim structure.

In the structure of the prism apparatus 692, through the prism module 692a and the lens module 692b, a rotation may occur in a first direction CRa, e.g., in a counterclockwise direction ccw based on a first rotation axis Axma and a rotation may occur in a second direction CRb, e.g., in a counterclockwise direction ccw based on a second rotation axis Axmb to perform the angle compensation, thereby achieving the optical image stabilization (OIS) function.

For example, in response to a movement causing rotation of the prism PSMa about the first rotation axis Axma by a first angle θ1 and rotation of the lens LNS about the second rotation axis Axmb by a second angle θ2, the first actuator ACTa is configured to rotate the prism PSMa in a third direction opposite the first direction by a third angle θ3 in response to the first control signal Saca, the second actuator ACTb is configured to rotate the lens LNS in a fourth direction opposite the second direction by a fourth angle in response to the second control signal Sacb. The third angle θ3 may be half of the first angle θ1, and the fourth angle may be half of the second angle θ2. Accordingly, the compensation angle for the optical image stabilization (OIS) becomes small, so that the accuracy of the optical image stabilization (OIS) may be improved.

In particular, since angular compensation is performed by using the first actuator ACTa and the second actuator ACTb, there is an advantage that it is enough to compensate only an angle within a given range, regardless of whether the optical zoom of the lens apparatus 693 is a low magnification or a high magnification. Hence, regardless of the optical zoom, the accuracy of optical image stabilization (OIS) can be improved.

In addition, since an optimal space arrangement can be accomplished in a limited space, a slim camera 600a can be implemented. Therefore, the present disclosure can be applied to the mobile terminal 100, and the like.

FIG. 5A illustrates that the length of the lens apparatus 693 is denoted by Wa and the length of the prism apparatus 692 is denoted by Wpa, and the heights of the lens apparatus 693 and the prism apparatus 692 are denoted by ha.

Since the prism module 692a and the lens module 692b in the prism apparatus 692 are disposed side by side, such that as shown in the mobile terminal 100a of FIG. 5B, a traveling direction of the incident light RI may be changed twice through the prism module 692a and the lens module 692b, and the image sensor 620 may be disposed on the left side of the mobile terminal 100a. In particular, the image sensor 620 may be disposed opposite the lateral side of the mobile terminal 100a.

Therefore, the thickness DDa of the mobile terminal 100y may be determined not by the sum (Wa+Wpa) of the lengths of the lens apparatus 693 and the prism apparatus 692, but by the height ha of the lens apparatus 693 and the prism apparatus 692 or the height ho of the image sensor.

Accordingly, as the height ha of the lens apparatus 693 and the prism apparatus 692 or the height ho of the image sensor is designed to be low, the thickness DDa of the mobile terminal 100y can be slimly implemented. Accordingly, the slim camera 600a having a thin thickness and a mobile terminal having the slim camera 600a can be implemented.

FIGS. 6A to 6D are diagrams referred to in the description of the prism apparatus 692 of FIG. 5A.

Figure 6A:
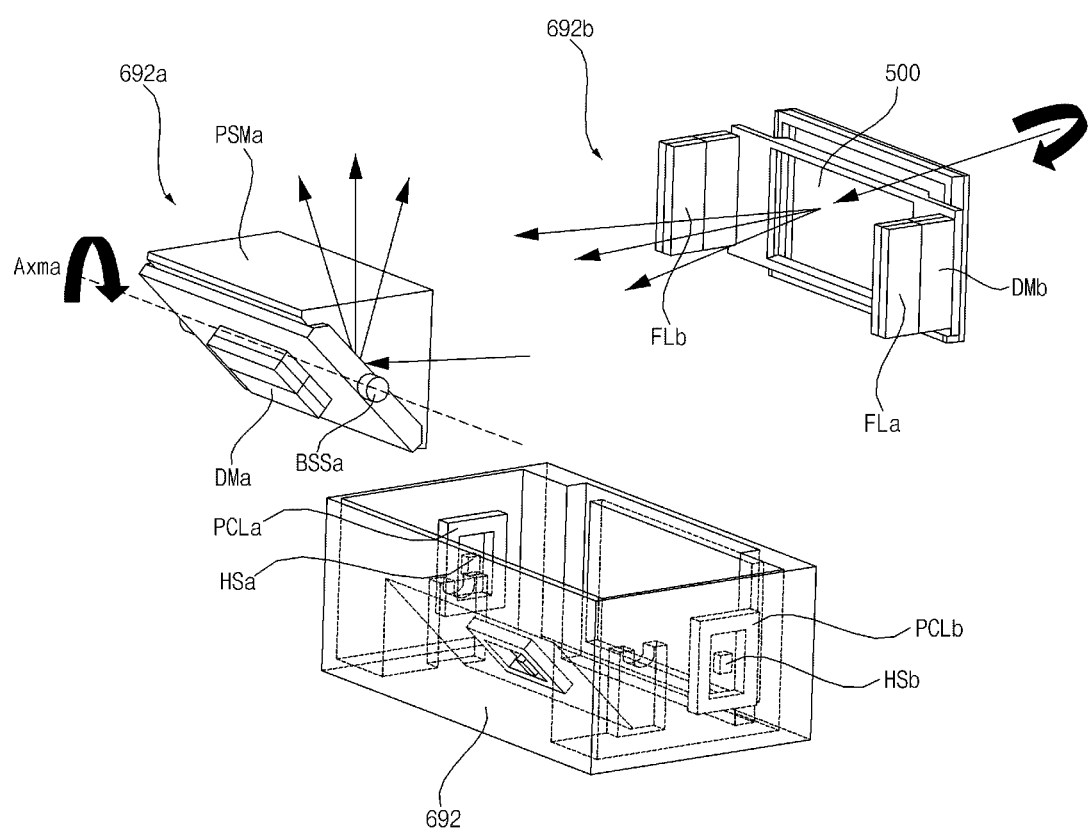

Referring to FIG. 6A, the prism apparatus 692 may include the prism module 692a and the lens module 692b.

Particularly, the incident light RI may be reflected from the prism module 692a, and the reflected light may be output through the lens module 692b.

Figure 6B:
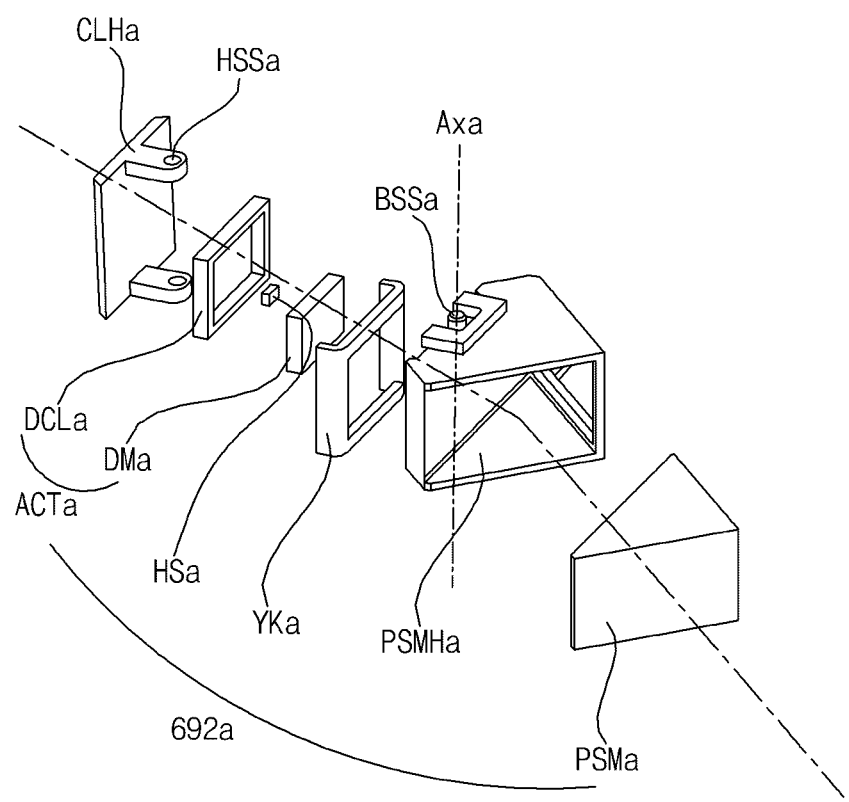

As illustrated in FIG. 6B, the prism module 692a may include: the prism PSMa; a prism holder PSMHa configured to secure the prism PSMa; a first yoke Yka coupled to a rear of the prism holder PSMHa; the first drive magnet DMa coupled to a rear of the first yoke Yka; a first coil holder CLHa including a plurality of protrusions protruding toward the prism holder PSMHa, each of the plurality of protrusions including an opening HSSa which defines the first rotation axis Axma.

The first drive coil DCLa may be disposed between the first coil holder CLHa and the first yoke Yka, the first prism holder PSMHa may comprise a plurality of bosses BSSa configured to engage with the openings of the plurality of protrusions to allow rotation of the prism PSMa about the prism PSMa axis.

Meanwhile, the drive magnet DMa and the drive coil DCLa in the prism module 692*a* may constitute a first rotary actuator ACTa.

For example, in order to compensate the first direction motion among the first direction motion and the second direction motion sensed by the motion sensor 145, particularly, the gyro sensor 145*c*, shown in FIG. 3C or FIG. 3D, the drive controller DRC may output the first control signal Saca to the first actuator ACTa in the prism module 692*a*.

The first actuator ACTa may change the angle of the prism PSMa based on the first rotation axis, based on the first control signal Saca.

In particular, based on the first control signal Saca applied to the drive coil DCLa in the first actuator ACTb, the angle of the prism PSMa can be changed based on the first rotation axis.

Meanwhile, the first hall sensor HSa may sense a change in the magnetic field in order to check motion information due to the movement of the prism PSMa. Specially, the first hall sensor HSa may sense an angle change of the prism PSMa based on a first magnetic field.

In addition, the motion information, particularly, the magnetic field or change of the magnetic field information Shsa, detected by the first hall sensor HSa may be input to the drive controller DRC.

The drive controller DRC may perform a PI control or the like, based on the control signal Saca for motion compensation and the motion information, in particular, the magnetic field or change of the magnetic field information Shsa. Accordingly, the motion of the prism PSMa can be accurately controlled.

That is, the drive controller DRC may perform a closed loop by receiving the information Shsa detected by the first hall sensor HSa, and can accurately control the motion of the prism PSMa.

Accordingly, the drive magnet DMa, the prism holder PSMHa, and the prism PSMa may be rotated based on the first rotation axis Axa.

Meanwhile, the coil holder CLHa, the drive coil DCLa, and the hall sensor HSa may be fixed without being rotated based on the first rotation axis Axa.

As described above, some units in the prism module 692*a* may rotate and some units may be fixed, thereby detecting the movement caused by hand tremble based on a magnetic field signal sensed in the hall sensor HSa. In order to perform optical image stabilization (OIS) for compensating movement of prism caused by hand tremble, the drive magnet DMa may rotate so that the prism PSMa or the like can be rotated. Thus, the optical image stabilization (OIS) in the first direction can be accurately performed.

FIG. 6C is a side view of the prism apparatus 692 of FIG. 6A, and FIG. 6D is a top view of the prism apparatus 692 of FIG. 6A.

Referring to FIGS. 6C and 6D, the lens module 692*b* may include the lens LNS, the second drive magnet DMb, the second drive coil DCLb, and the second hall sensor HSb.

The second drive coil DCLb and the second hall sensor HSb may be disposed on at least one of both sides of the lens module 692*b*.

The second drive coil DCLb may be disposed around the second hall sensor HSb to surround the second hall sensor HSb.

The drive magnet DMb and the drive coil DCLb in the lens module 692*b* may constitute a second rotary actuator ACTb.

For example, in order to compensate the second direction motion among the first direction motion and the second direction motion sensed by the motion sensor 145, particularly, the gyro sensor 145*c*, shown in FIG. 3C or FIG. 3D, the drive controller DRC may output the second control signal Sacb to the second actuator ACTb in the lens module 692*b*.

The second actuator ACTb may change the angle of the lens LNS based on the second rotation axis, based on the second control signal Sacb.

In particular, based on the second control signal Sacb applied to the drive coil DCLb in the second actuator ACTb, the angle of the lens LNS can be changed based on the second rotation axis.

Meanwhile, the second hall sensor HSb may sense a change in the magnetic field in order to check motion information due to the movement of the lens LNS. Specially, a second hall sensor HSb may sense an angle change of the lens LNS based on a second magnetic field.

In addition, the motion information, particularly, the magnetic field or change of the magnetic field information Shsb, detected by the second hall sensor HSb may be input to the drive controller DRC.

The drive controller DRC may perform a PI control or the like, based on the control signal Sacb for motion compensation and the motion information, in particular, the magnetic field or change of the magnetic field information Shsb. Accordingly, the motion of the lens LNS can be accurately controlled.

That is, the drive controller DRC may perform a closed loop by receiving the information Shsb detected by the second hall sensor HSb, and can accurately control the motion of the lens LNS.

Accordingly, the drive magnet DMb may be rotated based on the second rotation axis Axb, thereby accurately performing optical image stabilization (OIS) in the second reflected direction.

For example, when the prism PSMa is rotated in the clockwise direction CCW based on the first rotation axis Axa due to the hand tremble of the user, the drive controller DRC may control the prism PSMa, a first sensor magnet SMa, and the like to rotate in the counterclockwise direction CCW based on the first rotation axis Axa, by using the rotary actuator, particularly, the first drive magnet DMa and the first drive coil DCLa so as to perform optical image stabilization (OIS) for compensating movement of prism caused by hand tremble.

Particularly, when the first control signal Saca from the drive controller DRC is applied to the first drive coil DCLa in the first actuator ACTa, a Lorentz force may be generated between the first drive coil DCLa and the first drive magnet DMa, so that the first drive magnet DMa can rotate in the counterclockwise direction CCW.

At this time, the first hall sensor Hsa may detect a change in the magnetic field that is variable, by the counterclockwise CCW rotation of the first sensor magnet SMa.

In addition, the drive controller DRC may perform a closed loop based on the information Shsa detected by the first hall sensor HSa, so that the counterclockwise CCW rotation of the first drive magnet DMa can be more accurately controlled.

For another example, when the lens LNS is rotated in the clockwise direction CCW based on the second rotation axis Axb due to the hand tremble of the user, the drive controller DRC may control the lens LNS, a second sensor magnet SMb, and the like to rotate in the counterclockwise direction CCW based on the second rotation axis Axb, by using a second rotary actuator, particularly, the second drive magnet DMb and the second drive coil DCLb so as to perform optical image stabilization (OIS) for compensating movement of prism caused by hand tremble.

Particularly, when the second control signal Sacb from the drive controller DRC is applied to the second drive coil DCLb in the second actuator ACTb, a Lorentz force may be generated between the second drive coil DCLb and the second drive magnet DMb, so that the second drive magnet DMb can rotate in the counterclockwise direction CCW.

At this time, the second hall sensor Hsb may detect a change in the magnetic field that is variable, by the counterclockwise CCW rotation of the first sensor magnet SMa.

In addition, the drive controller DRC may perform a closed loop based on the information Shsa detected by the second hall sensor HSa, so that the counterclockwise CCW rotation of the first drive magnet DMa can be more accurately controlled.

As described above, the prism module 692a and the lens module 692b may be independently driven respectively, based on the first rotation axis Axa and the second rotation axis Axb, depending on the hand tremor movement. Therefore, the optical image stabilization (OIS) for a plurality of directions can be performed quickly and accurately.

Meanwhile, when the prism PSMa moves at a first angle of a first direction of the first rotation axis Axa, the first actuator ACTa may change the prism PSMa into a second angle θ2 which is half of the first angle θ1, in a second direction opposite to the first direction of the first rotation axis Axa. According to this, motion compensation may be performed at an angle smaller than the motion of the user's hand tremble in spite of the motion of the user's hand tremble, so that accurate optical image stabilization (OIS) can be performed. In addition, the power consumption can also be reduced.

Meanwhile, when the lens LNS moves at a third angle θ3 in a third direction of the second rotation axis Axb, the second actuator ACTb may change the lens LNS into a fourth angle θ4 which is half the third angle θ3, in a fourth direction opposite to the third direction of the second rotation axis Axb. According to this, motion compensation may be performed at an angle smaller than the motion of the user's hand tremble in spite of the motion of the user's hand tremble, so that accurate optical image stabilization (OIS) can be performed. In addition, the power consumption can also be reduced. This will be described with reference to FIGS. 9A to 9C below.

FIGS. 7A to 7D are diagrams referred to in the description of a lens module according to an embodiment of the present disclosure.

Figure 7A:
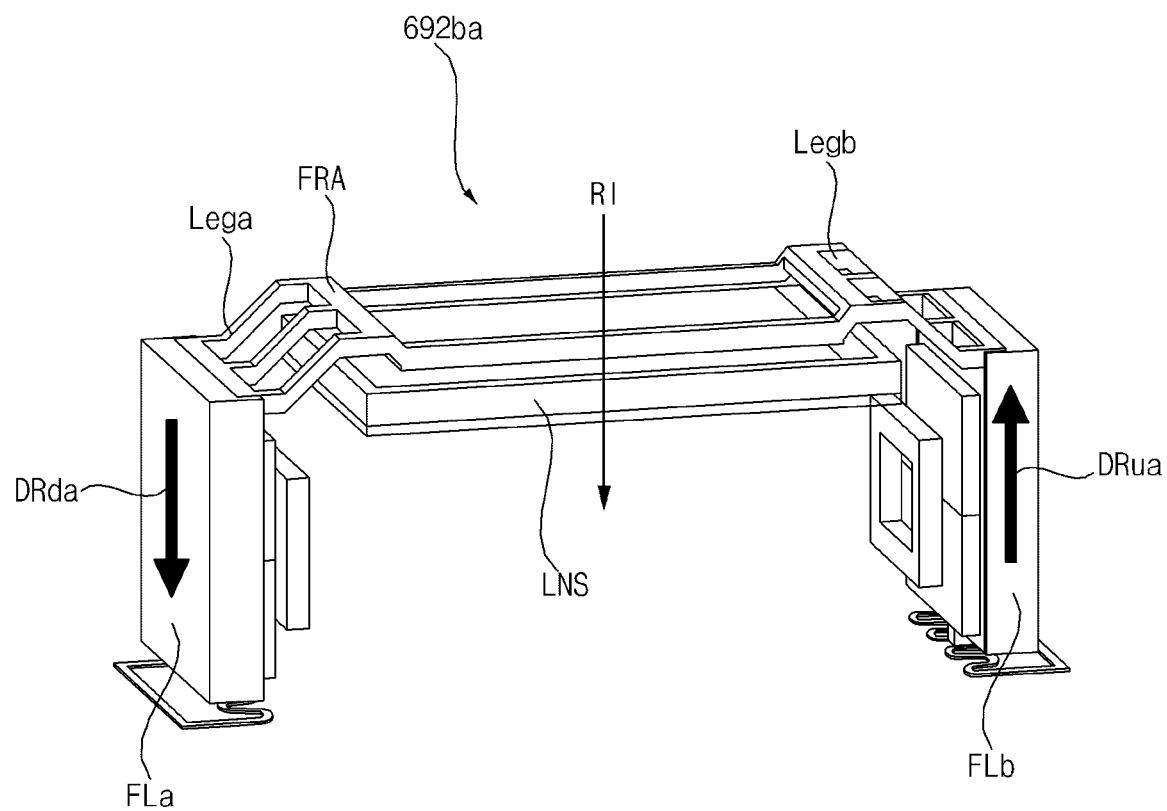
Figure 7B:
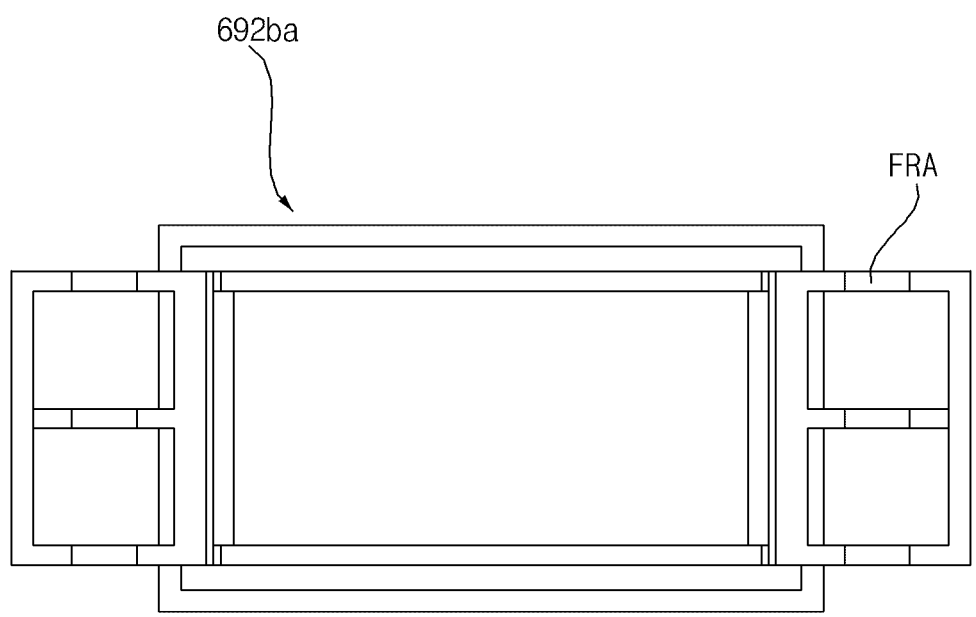
Figure 7C:
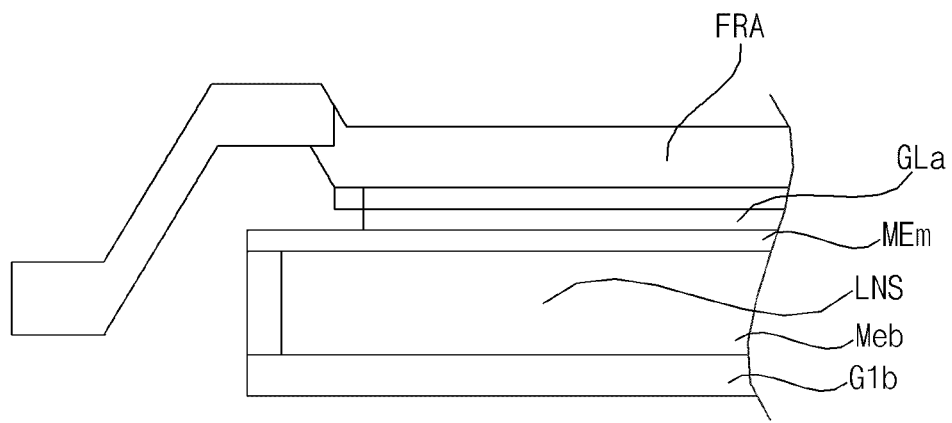

Referring to the drawings, a lens module 692ba according to an embodiment of the present disclosure may include, as illustrated in FIG. 7C, the lens LNS, a metal base (MEb) and a glass base GLb disposed below the lens LNS and surrounding the edge of the lens LNS, and a membrane MEM, glass GLa, and a frame FRa which are disposed above the lens LNS and surrounding the edge of the lens LNS.

The frame Fra may include a first leg Lega and a second leg Legb which extend toward both sides of the lens LNS.

A first driving device FLa and a second driving device FLb, which move upward or downward based on a voice coil motor (VCM), may be disposed on the first leg Lega and the second leg Legb, respectively.

By the operation of the first driving device FLa and the second driving device FLb, each of the first leg Lega and the second Legb may move upward or downward, thereby allowing the frame FRa and the lens LNs to move upward or downward.

The first driving device FLa and the second driving device FLb may operate as the second actuator ACTb.

Accordingly, the second actuator ACTb includes the first driving device FLa and the second driving device FLb which are connected to both ends of the frame FRA, and the second actuator ACTb may change the second reflected direction CRb by moving at least one of the first driving device FLa and the second driving device FLb.

Referring to FIG. 7A, an example is illustrated in which the first driving device FLa moves downward, and the second driving device FLa moves upward.

While in operation, the first driving device FLa and the second driving device FLb preferably operate in opposite directions.

Figure 7D:
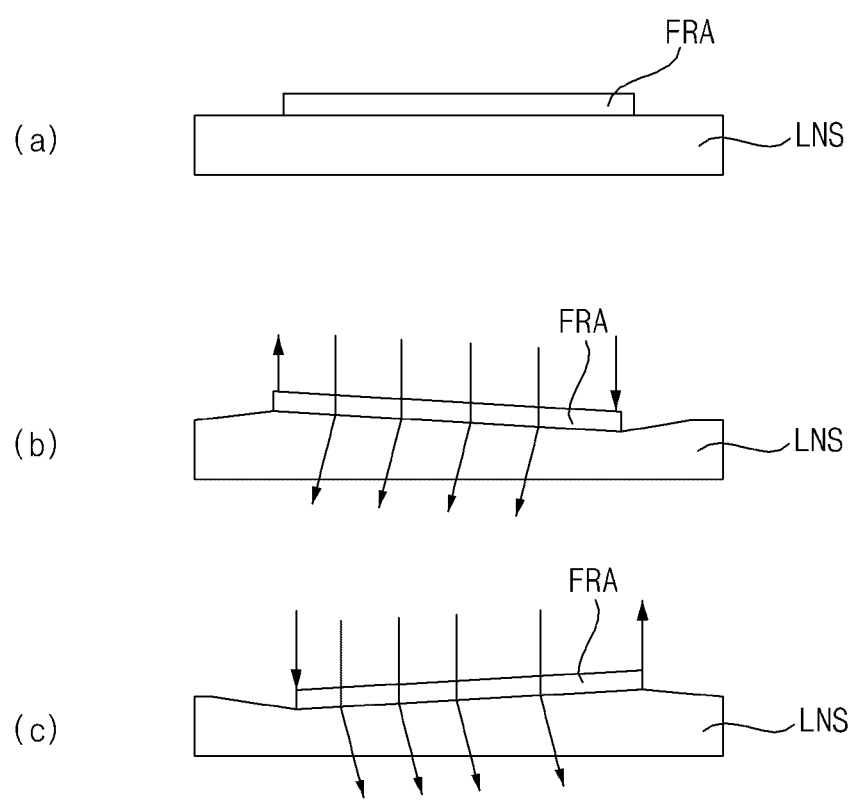

In FIG. 7D, (a) illustrates an example in which the first driving device FLa and the second driving device FLb do not operate, such that the frame FRa and the lens LNS do not move.

Accordingly, the light Ri incident on the lens module 692ba may be output without change of direction.

In FIG. 7D, (b) illustrates an example in which the first driving device FLa moves upward and the second driving device FLb moves downward.

Accordingly, the left side of the frame FRa and the lens LNS moves upward, and the right side thereof moves downward, such that the light Ri incident on the lens module 692ba may be refracted to the left as illustrated herein.

In FIG. 7D, (c) illustrates an example in which the first driving device FLa moves downward and the second driving device FLb moves upward.

Accordingly, the right side of the frame FRa and the lens LNS moves upward, and the left side thereof moves downward, such that the light Ri incident on the lens module 692ba may be refracted to the right as illustrated herein.

FIGS. 8A to 8D are diagrams referred to in the description of a lens module according to another embodiment of the present disclosure.

Figure 8A:
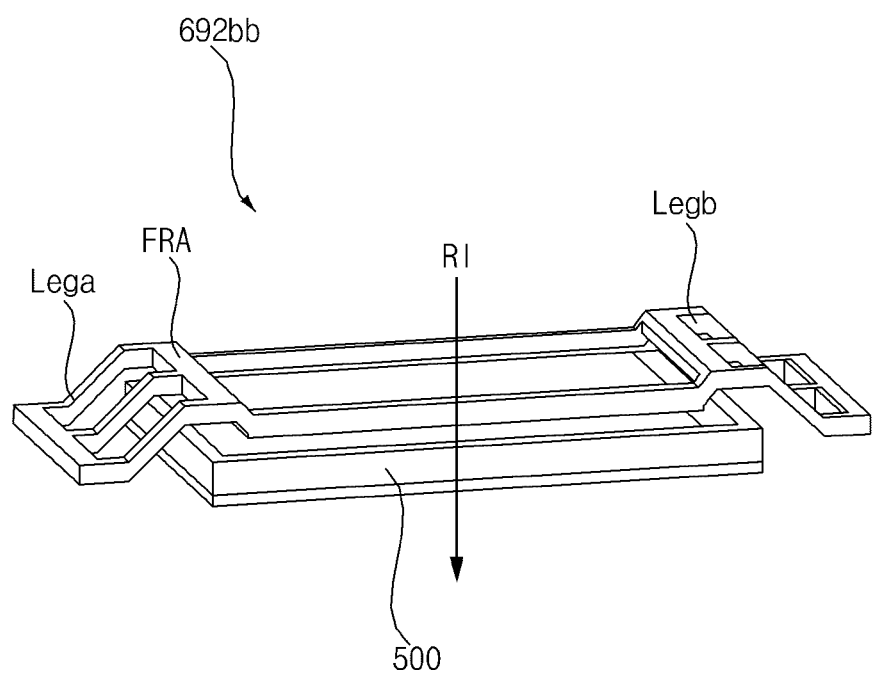
Figure 8B:
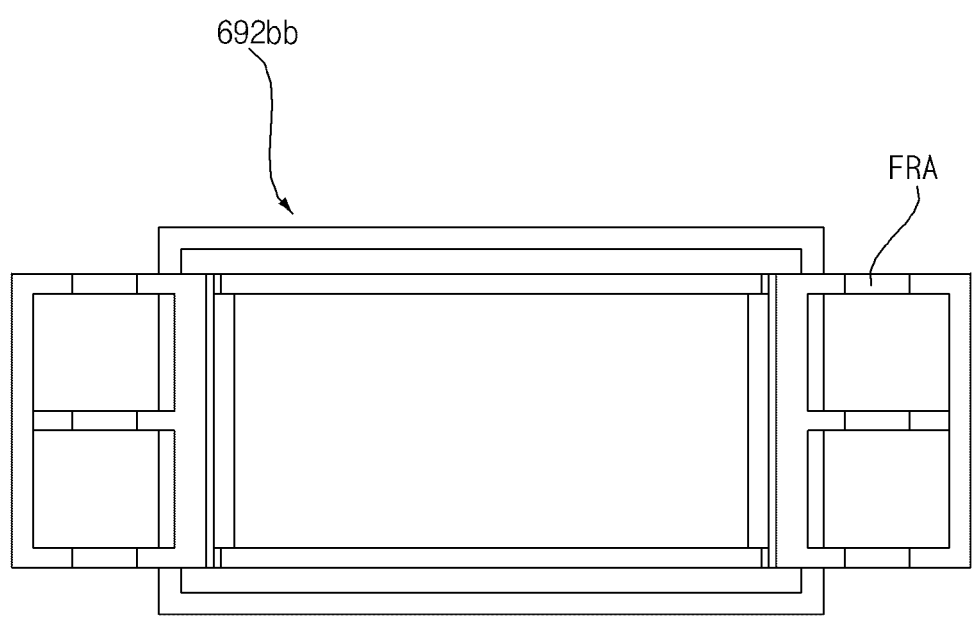
Figure 8C:
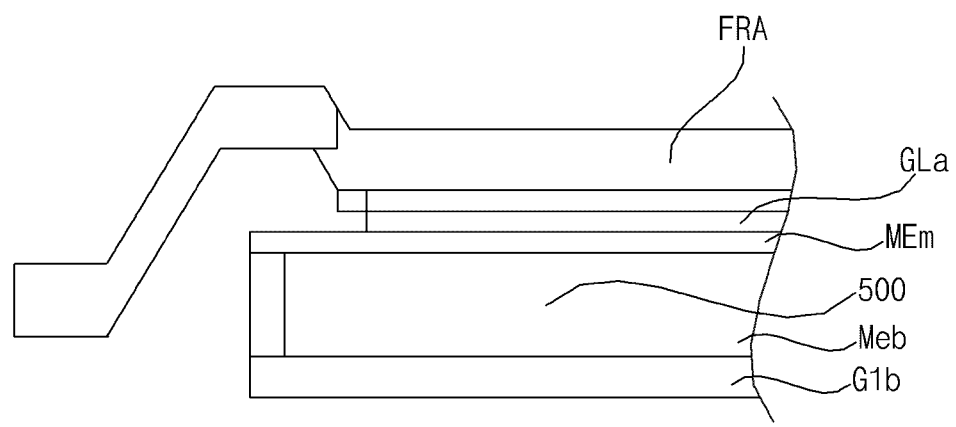

Referring to the drawings, a lens module 692bb according to another embodiment of the present disclosure may include, as illustrated in FIG. 8C, a liquid lens 500, a metal base MEb and a glass base GLb disposed below the liquid lens 500 and surrounding the edge of the lens LNS, and a membrane MEM, glass GLa, and a frame FRa which are disposed above the liquid lens 500 and surround the edge of the liquid lens 500.

The frame FRa may include a first leg Lega and a second leg Legb which extend toward both sides of the liquid lens 500.

Unlike FIGS. 7A to 7D, no driving device is connected to the first leg Lega and a second leg Legb.

In the lens module 692bb according to another embodiment of the present disclosure, a curvature of the liquid lens 500 is varied according to an electrical signal applied to the liquid lens 500 without a separate driving device, such that a traveling direction of the incident light Ri may be changed.

Accordingly, the liquid lens 500 may operate as the second actuator ACTb.

Figure 8D:
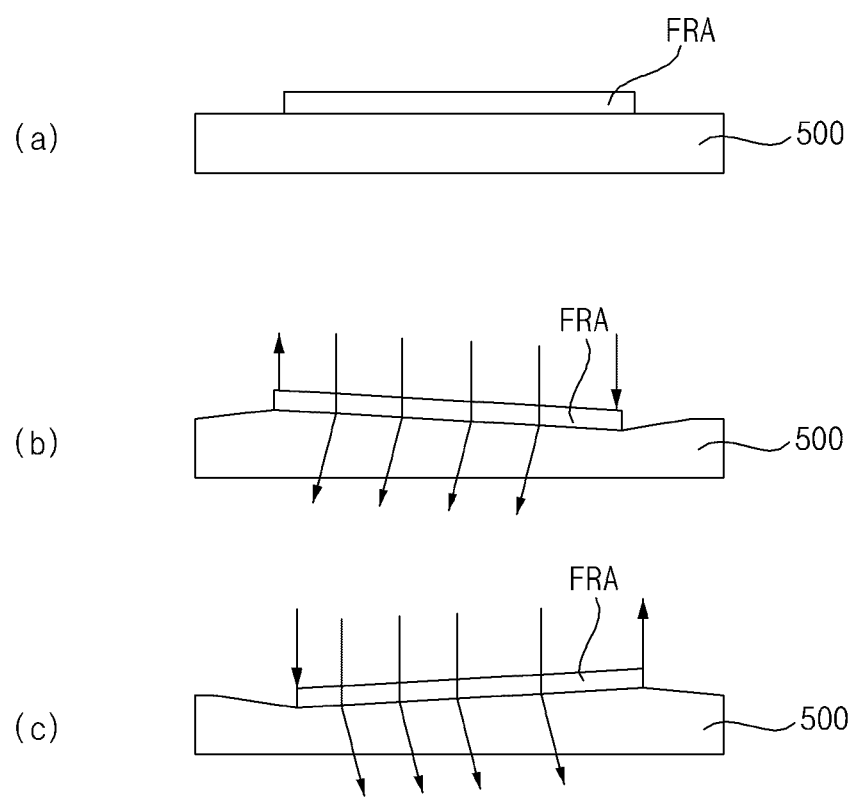

In FIG. 8D, (a) illustrates an example in which an electrical signal is not applied to the liquid lens 500, such that the frame FRa and the liquid lens 500 do not move.

Accordingly, the light Ri incident on the lens module 692bb may be output without change of direction.

In FIG. 8D, (b) illustrates an example in which an electrical signal is applied to the liquid lens 500, such that the left side of the liquid lens 500 moves upward, and the right side thereof moves downward.

Thus, the light Ri incident on the lens module 692bb may be refracted to the left as illustrated herein.

In FIG. 8D, (c) illustrates an example in which an electrical signal is applied to the liquid lens 500, such that the right side of the liquid lens 500 moves upward, and the left side thereof moves downward.

Accordingly, the light Ri incident on the lens module 692bb may be refracted to the right as illustrated herein.

The operation of the liquid lens 500 will be described in further detail later with reference to FIGS. 12A to 15B.

Figure 9A:
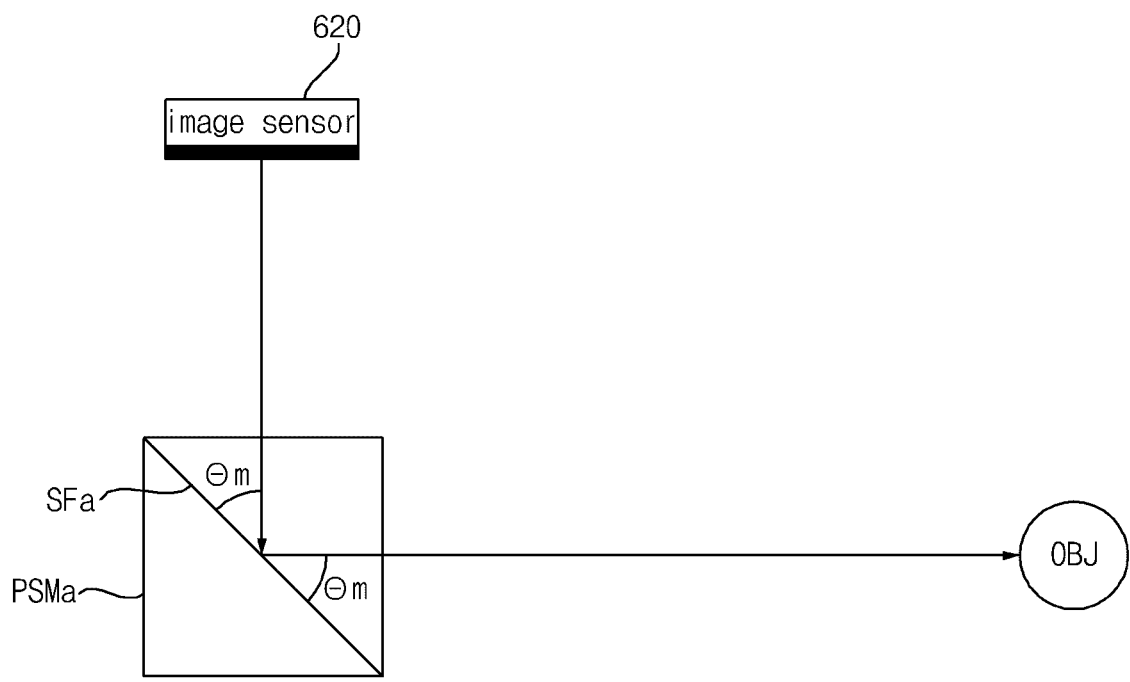
Figure 9B:
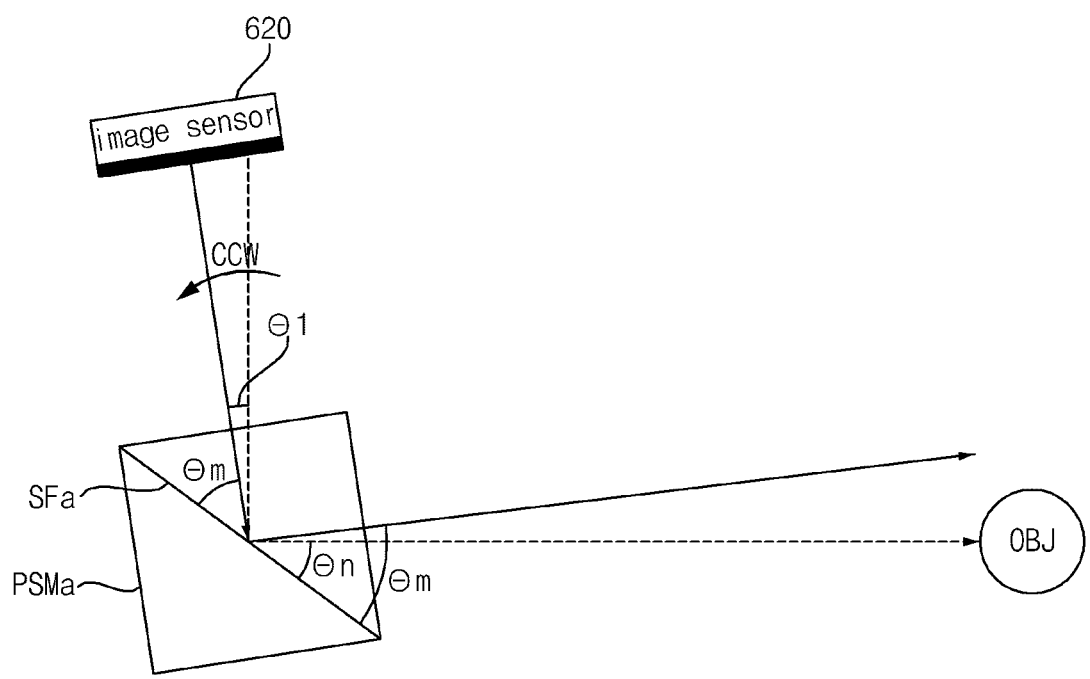
Figure 9C:
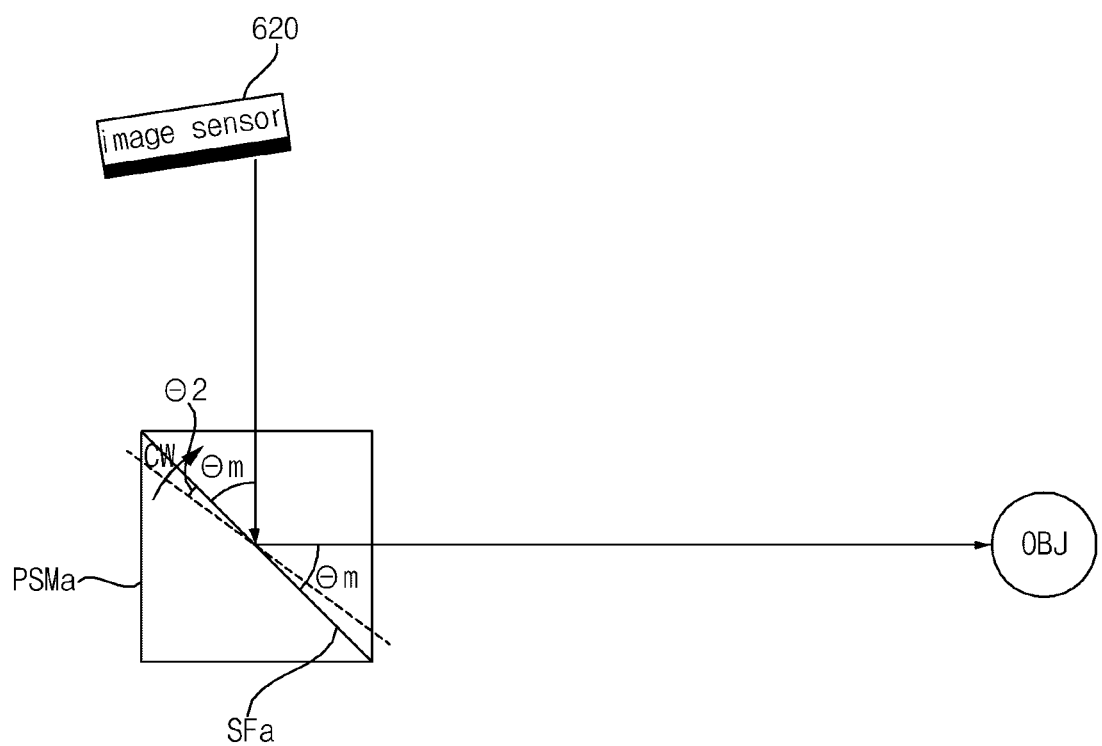

FIGS. 9A to 9C are diagrams referred to in the description of the hand tremble motion and optical image stabilization (OIS) according to the hand tremble motion.

Hereinafter, for convenience of explanation, the image sensor 620, the prism PSMa, and a front object OBL will be described.

Firstly, FIG. 9A illustrates that the prism PSMa disposed between the front object OBL and the image sensor 620 is fixed, when there is no hand tremble motion of the user.

Referring to FIG. 9A, the image sensor 620 and the reflection surface SFa of the prism PSMa may have an angle θm, and the angle between the reflection surface SFa of the prism PSMa and the front object OBL may be the same angle θm. Here, the angle θm may be approximately 45 degrees.

According to this, the image sensor 620 may capture a light for the front object OBL, through the light which is reflected and inputted by the reflection surface SFa of the prism PSMa, and convert the captured light into an electric signal. Therefore, image conversion for the front object OBL can be achieved.

Next, FIG. 9B illustrates that the prism PSMa disposed between the front object OBL and the image sensor 620 rotates in the counterclockwise direction CCW by the first angle θ1, when the hand tremble of the user is generated in the counterclockwise direction CCW by the first angle θ1.

Referring to FIG. 9B, the image sensor 620 and the reflection surface SFa of the rotated prism PSMa may have an angle θm, but the angle between the reflection surface SFa of the rotated prism PSMa and the front object OBL may be θn smaller than the angle θm.

In other words, the image sensor 620 and the reflection surface SFa of the rotated prism PSMa have an angle θm, and the front object OBL does not exist in the direction of the angle θm from the reflection surface SFa of the rotated prism PSMa.

Therefore, the image sensor 620 cannot capture the light for the front object OBL, through the light which is reflected and inputted by the reflection surface SFa of the prism PSMa.

Thus, the first actuator ACTa may rotate the prism PSMa at the second angle θ2 which is half the first angle θ1, in the clockwise direction CW.

FIG. 9C illustrates that the prism PSMa is rotated by the second angle θ2 which is half the first angle θ1 in the clockwise direction CW, in order to perform optical image stabilization (OIS) for compensating movement of prism caused by hand tremble of the user.

Accordingly, like FIG. 9A, the image sensor 620 and the reflection surface SFa of the rotated prism PSMa may have an angle θm, and the angle between the reflection surface SFa of the rotated prism PSMa and the front object OBL may be θm.

According to this, the image sensor 620 may capture the light for the front object OBL, through the light reflected and inputted by the reflection surface SFa of the prism PSMa, and convert the light into an electric signal. Therefore, in spite of the hand tremble, the image conversion for the front object OBL can be stably achieved through the optical image stabilization (OIS).

Figure 10:
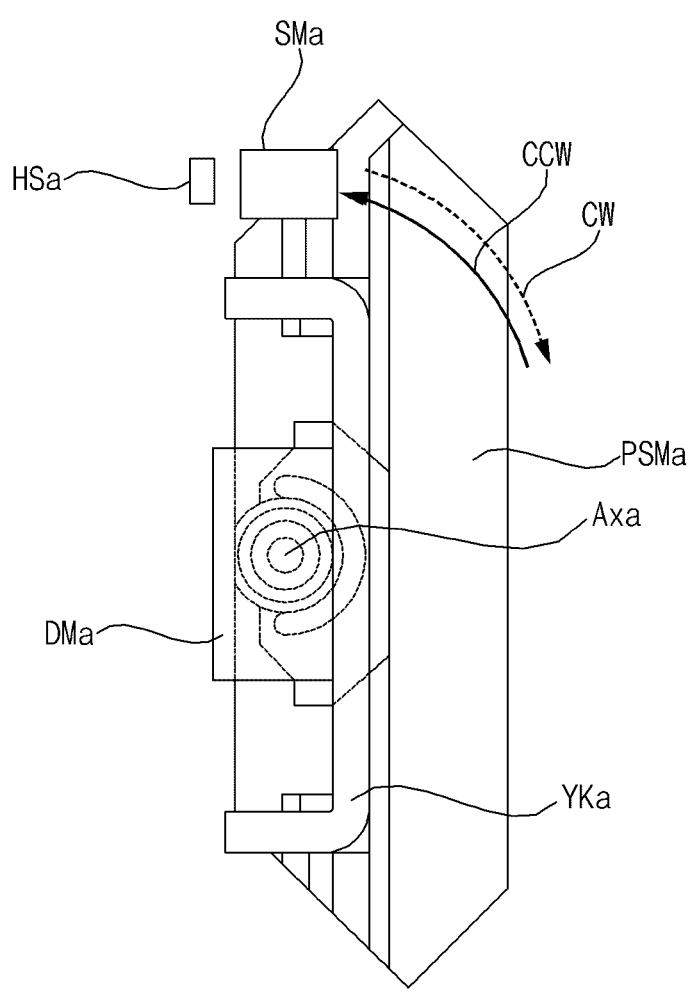

FIG. 10 is a diagram of the prism module 692a of FIG. 5A, looking down from above the first rotation axis Axa.

According to the prism module 692a of FIG. 10, the prism PSMa may be disposed on a first surface of the prism holder PSMHa, and the yoke Yka may be disposed on a second surface, which is a rear surface of the first surface of the prism holder PSMHa. Particularly, the first surface of the yoke Yka may be disposed on the second surface of the prism holder PSMHa.

Meanwhile, the sensor magnet SMa may be disposed in the upper side of the yoke Yka, and the hall sensor Hsaz may be disposed apart from the sensor magnet SMa.

That is, in a state where the rotation axis Axa is positioned in the vertical direction of the ground, the yoke Yka may be disposed around the rotation axis AXa, the sensor magnet SMa may be disposed apart from the yoke Yka, and the hall sensor Hsa may be disposed apart from the sensor magnet SMa.

At this time, a separation distance may be increased in the order of the yoke Yka, the sensor magnet SMa, and the hall sensor Hsa, based on the rotation axis AXa.

Meanwhile, the yoke Yka and the sensor magnet SMa may be spaced apart from each other in the vertical direction of the ground, and the sensor magnet SMa and the hall sensor Hsa may be spaced apart from each other in the horizontal direction.

That is, the spacing direction between the yoke Yka and the sensor magnet SMa, and the spacing direction between the sensor magnet SMa and the hall sensor Hsa may intersect with each other.

Meanwhile, the positions of the hall sensor Hsa and the sensor magnet SMa can be variously modified.

In this case, as described above with reference to FIG. 5A, when the prism PSMa rotates in a first clockwise direction CCW based on the first rotation axis Axa due to the hand tremble of the user, the drive controller DRC may control the prism PSMa, the first sensor magnet SMa, and the like to rotate in the counterclockwise direction CCW based on the first rotation axis Axa, by using the first rotary actuator, particularly, the first drive magnet DMa and the first drive coil, in order to compensate for hand-trembling.

Particularly, when the first control signal Saca from the drive controller DRC is applied to the first drive coil DCLa inside the first actuator ACTa, a Lorentz force may be generated between the first drive coil DCLa and the first drive magnet DMa, so that the first drive magnet DMa can rotate in the counterclockwise direction CCW.

At this time, the first hall sensor Hsa may sense a change in the magnetic field that is variable, by the counterclockwise CCW rotation of the first sensor magnet SMa.

Meanwhile, when the range of the rotation angle of the clockwise direction CW due to the hand tremble is approximately between 10 degrees and −10 degrees, the angle compensation range by the rotation in the counterclockwise direction CCW may be approximately between 5 degrees and −5 degrees which is half of the range of the rotation angle of the clockwise direction CW due to the hand tremble.

Meanwhile, referring to FIG. 10, even if the rotation angle of the clockwise direction CW is small as the hand tremble is small, the hall sensor Hsa can perform an accurate detection, thereby improving the accuracy of the angle compensation for the rotation of counterclockwise direction CCW.

Meanwhile, the description of FIG. 10 is given based on the prism module 692a among the prism module 692a and the lens module 692b of FIG. 5A, and can be applied to the prism module 692a. However, the present disclosure is not limited thereto, and can also be applied to the lens module 692b.

Figure 11:
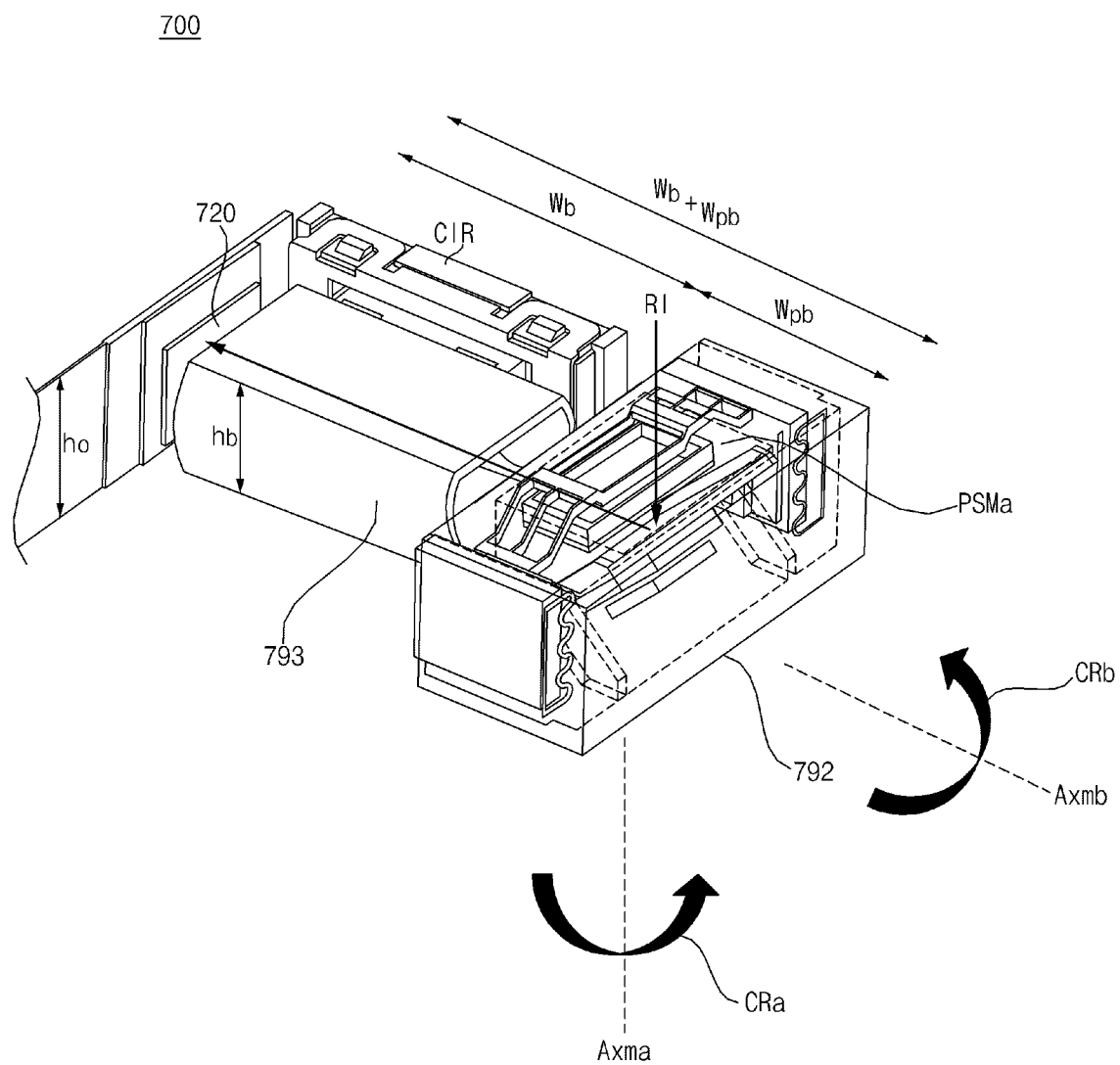
FIG. 11 is a diagram illustrating an example of a camera apparatus including a rotatable prism apparatus according to another embodiment of the present disclosure.

FIG. 11 is a diagram illustrating an example of a camera apparatus including a rotatable prism apparatus according to another embodiment of the present disclosure.

Referring to the drawing, a camera 700a of FIG. 11 includes an image sensor 720, a lens apparatus 793 delivering light to the image sensor 720, and a prism apparatus 792 including the prism module 792a and the lens module 792b.

The prism apparatus 792 of FIG. 11 is different from FIG. 4A in that the prism apparatus 792 rotates to provide an optical image stabilization (OIS) function.

Further, the camera 700a of FIG. 11 is different from the camera 600a of FIG. 5A in that an arrangement of the prism apparatus 792 is changed.

That is, the incident light first passes through the lens module 792b in the prism apparatus 792, and then the light output from the lens module 792b may be incident on the prism module 792a.

The following description will be focused on a difference from FIG. 5A.

The prism apparatus 792 of FIG. 11 includes: a lens LNS configured to output the incident light toward a first reflected direction CRa; a first actuator ACTa configured to change an angle of the lens LNS about a first rotation axis Axma to change the first reflected direction CRa based on a second control signal Sacb; a prism PSMa configured to reflect the light, output from the lens LNS, toward a second reflected direction CRb; and a second actuator ACTb configured to change an angle of the prism PSMa about a second rotation axis Axmb to change the second reflected direction CRb based on a first control signal Saca. Accordingly, it is possible to perform optical image stabilization (OIS) for compensating for prism movement. In particular, the optical image stabilization (OIS) can be implemented based on a plurality of rotation axes by independently rotating the prism. Further, since the optical paths of the first prism PSMa and the lens LNS are different from each other, a slim camera having a reduced thickness can be implemented.

Figure 12A:
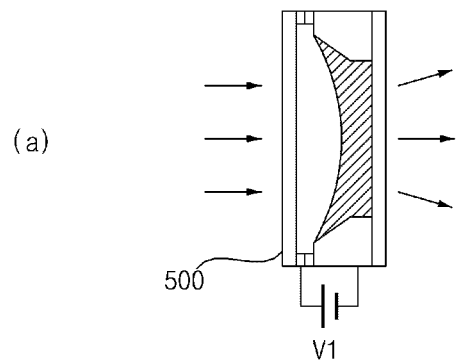
FIGS. 12A and 12B are diagrams explaining a driving method of a liquid lens.
Figure 12A:
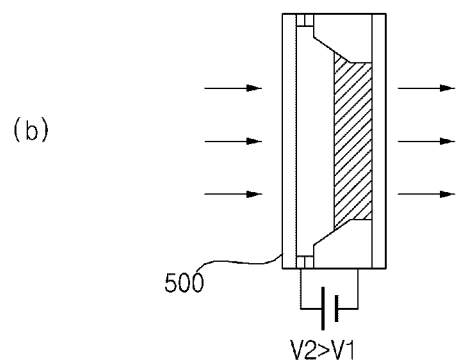
Figure 12A:
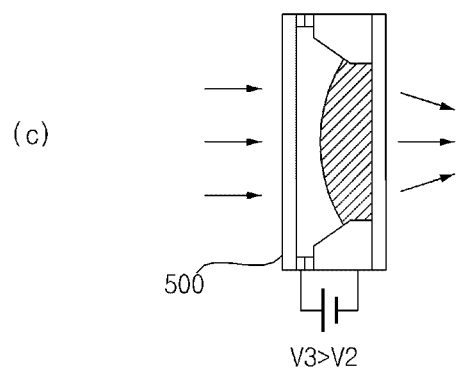
Figure 12B:
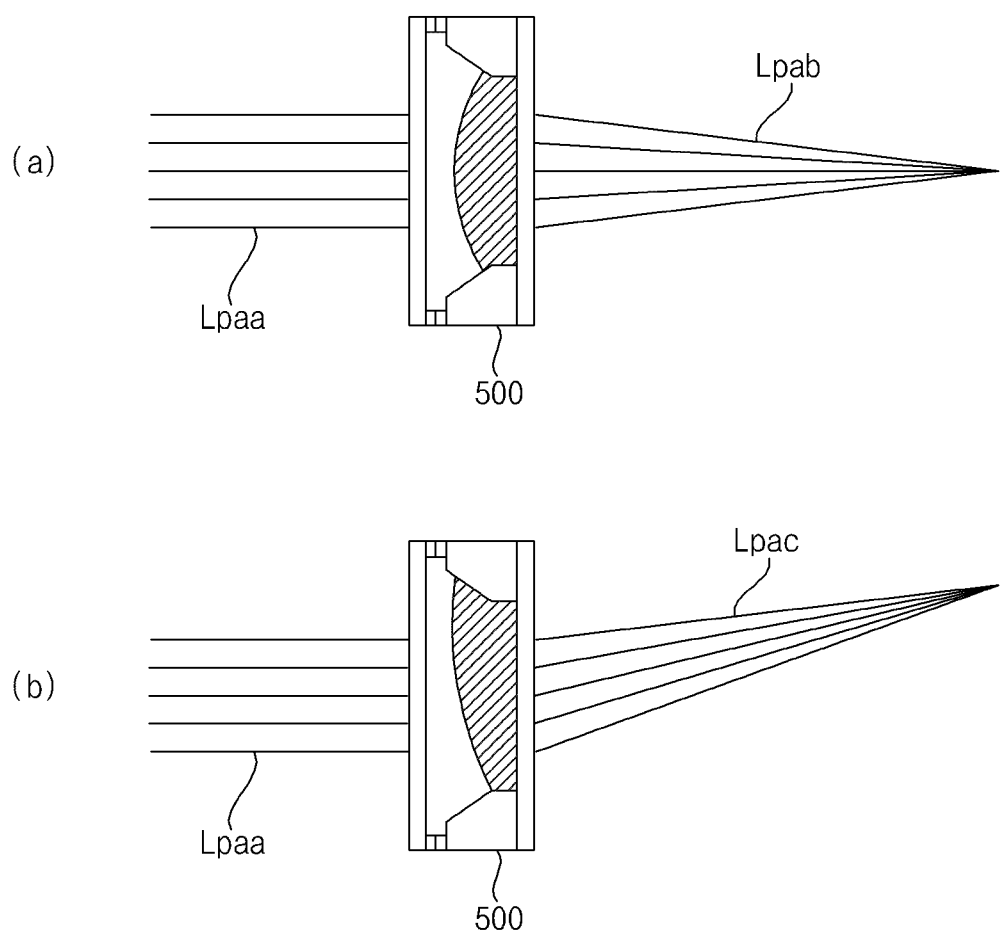

FIGS. 12A and 12B are diagrams explaining a driving method of a liquid lens.

First, (a) of FIG. 12A illustrates an example in which a first voltage V1 is applied to the liquid lens 600 such that the liquid lens 600 operates as a concave lens.

Then, (b) of FIG. 12A illustrates an example in which a second voltage V2, greater than the first voltage V1, is applied to the liquid lens 600 such that the liquid lens does not change a light traveling direction.

Next, (c) of FIG. 12A illustrates an example in which a third voltage V3, greater than the second voltage V2, is applied to the liquid lens 600 such that the liquid lens operates as a convex lens.

While FIG. 12A illustrates an example in which the curvature or diopter of the liquid lens is changed according to a level of the applied voltage, the curvature or diopter of the liquid lens is not limited thereto and may also be changed according to a pulse width of the applied pulse.

Subsequently, (a) of FIG. 12B illustrates an example in which liquids in the liquid lens 600 have the same curvature, such that the liquid lens 600 operates as a convex lens.

That is, as illustrated in (a) of FIG. 12B, the incident light Lpaa converges, such that a corresponding output light beam Lpab may be output.

Next, (b) of FIG. 12B illustrates an example in which liquids in the liquid lens 600 have an asymmetric curved surface, such that a light traveling direction is changed to an upward direction.

That is, as illustrated in (b) of FIG. 12B, the incident light Lpaa is concentrated in an upward direction, such that a corresponding output light beam Lpac may be output.

Figure 13A:
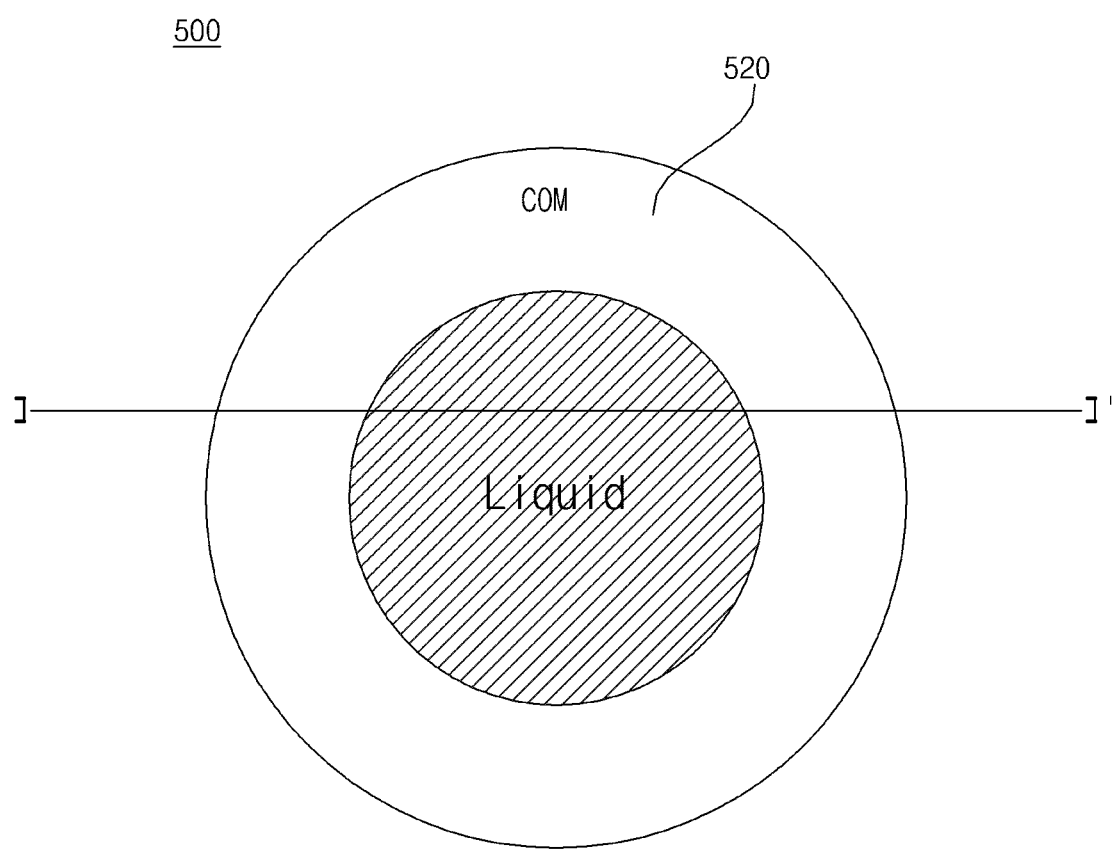
FIGS. 13A to 13C are diagrams illustrating a structure of a liquid lens.
Figure 13B:
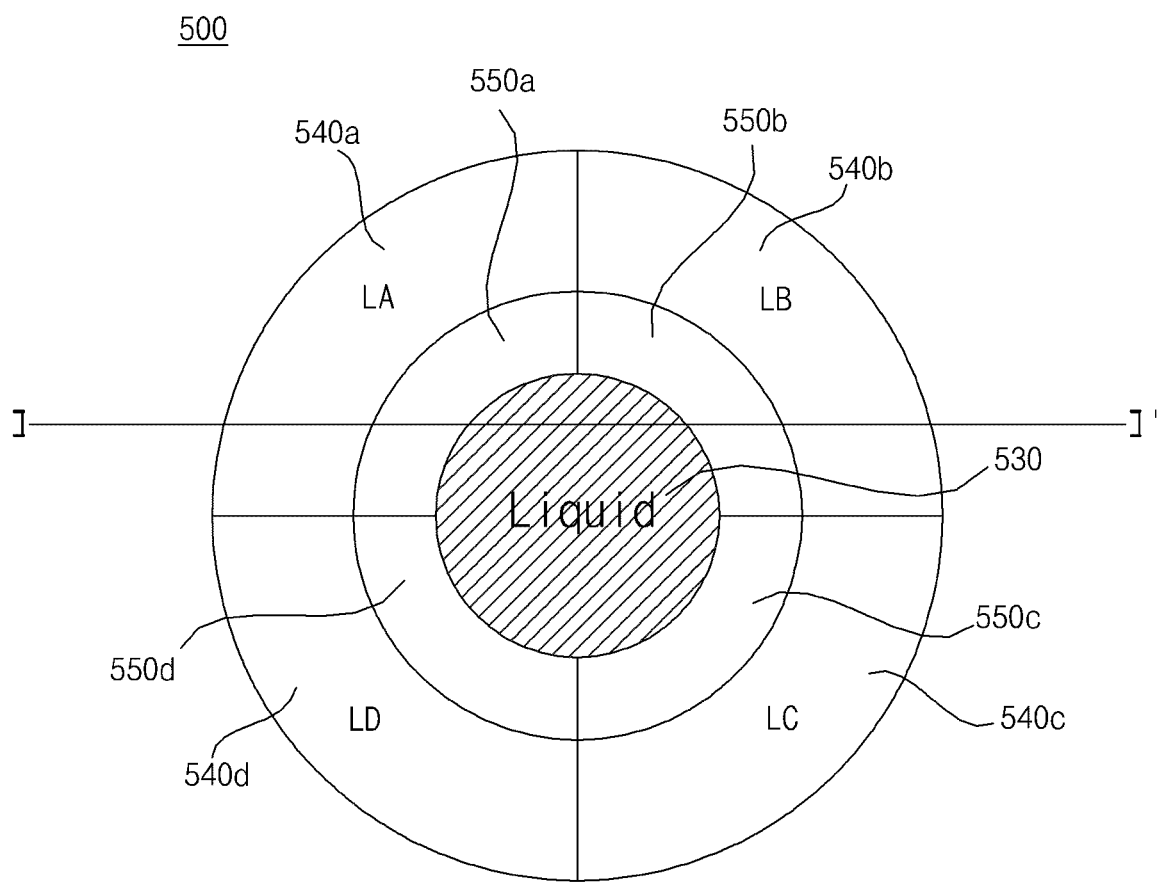
Figure 13C:
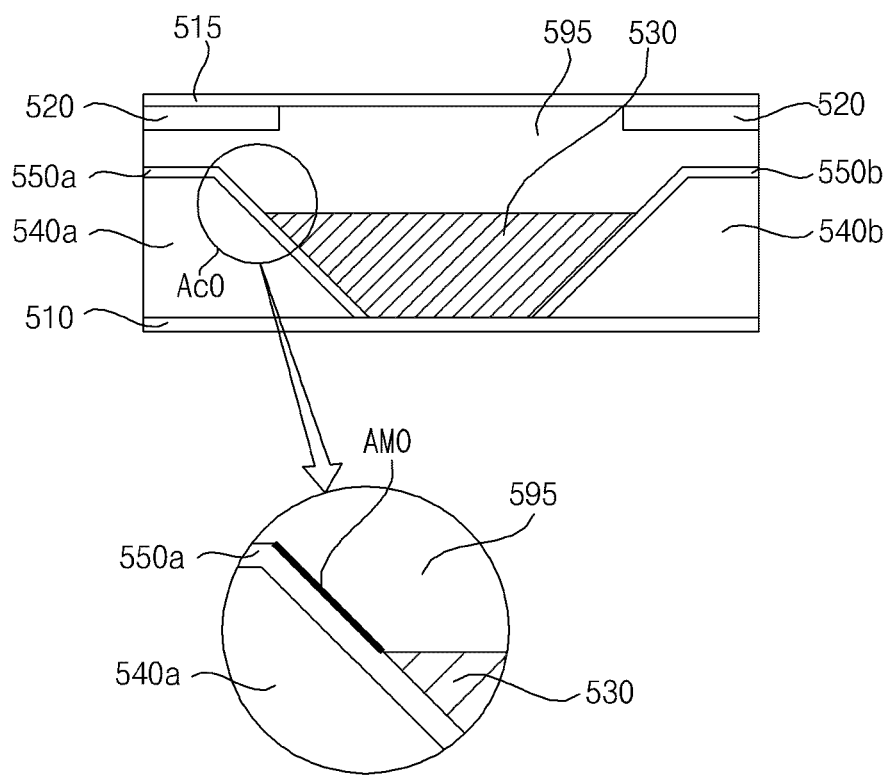

FIGS. 13A to 13C are diagrams illustrating a structure of a liquid lens. Particularly, FIG. 13A illustrates a top view of the liquid lens, FIG. 13B illustrates a bottom view of the liquid lens, and FIG. 13C illustrates a cross-sectional view as taken along line I-I' of FIGS. 13A and 13B.

Particularly, FIG. 13A is a view corresponding to a right surface of the liquid lens 600 of FIGS. 12A and 12B, and FIG. 13B is a view corresponding to the left surface of the liquid lens 600 of FIGS. 12A and 12B.

Referring to the drawings, the liquid lens 600 may have a common electrode COM 620 formed on the upper part as illustrated in FIG. 13A. In this case, the common electrode COM 620 may be formed in a tube shape, and a liquid 630 may be disposed in a lower region, particularly a region corresponding to a hollow, of the common electrode COM 620.

Although not illustrated herein, an insulator (not shown) for insulation of the common electrode COM 620 may be disposed between the common electrode COM 620 and the liquid.

Further, as illustrated in FIG. 13B, a plurality of electrodes LA to LD 640a to 540d may be disposed below the common electrode COM 620, particularly below the liquid 630. The plurality of electrodes LA to LD 640a to 540d may be formed to surround the liquid 630.

In addition, a plurality of insulators 650a to 550d provided for insulation may be respectively disposed between the plurality of electrodes LA to LD 640a to 540d and the liquid 630.

That is, the liquid lens 600 may include: the common electrode COM 620; the plurality of electrodes LA to LD 640a to 540d which are spaced apart from the common electrode COM 620; and the liquid 630 and the electroconductive aqueous solution 595 of FIG. 13C which are disposed between the common electrode COM 620 and the plurality of electrodes LA to LD 640a to 540d.

Referring to FIG. 13C, the liquid lens 600 may include: the plurality of electrodes LA to LD 640a to 540d formed on a first substrate 610; the plurality of insulators 650a to 550d for insulation of the plurality of electrodes LA to LD 640a to 540d; the liquid 630 placed over the plurality of electrodes LA to LD 640a to 540d; the electroconductive aqueous solution 695 placed over the liquid 630; the common electrode COM 620 being spaced apart from the liquid 630; and a second substrate 615 disposed on the common electrode COM 620.

The common electrode 620 may have a hollow region and may be formed in a tube shape. Further, the liquid 630 and the electroconductive aqueous solution 695 may be placed in the hollow region. As illustrated in FIGS. 13A and 13B, the liquid 630 may be provided in a circular shape. In this case, the liquid 630 may be a non-conductive liquid such as oil and the like.

A size of the hollow region may increase from the bottom to the top, such that a size of the plurality of electrodes LA to LD 640a to 540d may decrease from the bottom to the top.

In FIG. 13C, an example is illustrated in which among the plurality of electrodes LA to LD 640a to 540d the first electrode LA 640a and the second electrode LB 640b are inclined, and the size thereof decreases from the bottom to the top.

Unlike FIGS. 13A to 13C, it is also possible that the plurality of electrodes LA to LD 640a to 540d may be formed at an upper position where the common electrode 620 is formed, and the common electrode 620 may be formed at a lower position.

While FIGS. 13A to 13C illustrates four electrodes as an example of the plurality of electrodes, the electrodes are not limited thereto, and various numbers, e.g., two or more, of electrodes may be formed.

In FIG. 13C, in the case where a pulse type electrical signal is applied to the common electrode 620, and then after a lapse of a predetermined period of time, a pulse type electrical signal is applied to the first electrode LA 640a and the second electrode LB 640b, a potential difference occurs between the common electrode 620, the first electrode LA 640a, and the second electrode LB 640b, such that a shape of the electroconductive aqueous solution 695 having electrical conductivity is changed, resulting in a change in shape of the liquid 630 in response to the change in the shape of the electroconductive aqueous solution 695.

The present disclosure provides a method of simply and rapidly detecting a curvature of the liquid 630 which is formed according to the electrical signals applied to the plurality of electrodes LA to LD 640a to 540d and the common electrode 620.

To this end, the sensor device 962 of the present disclosure sense a size of an area, or a change in the area, of a boundary region Ac0 between a first insulator 650a, disposed on the first electrode 640a, and the electroconductive aqueous solution in the liquid lens 600.

In FIG. 13C, the area of the boundary region Ac0 is denoted by AM0. Particularly, in an inclined portion of the first insulator 650a on the first electrode 640a, an area of the boundary region Ac0 which comes into contact with the electroconductive aqueous solution 695 is denoted by AM0.

FIG. 13C illustrates an example in which the liquid 630 is not convex or concave, but is parallel to the first substrate 610 and the like. In this case, a curvature may be defined as, for example, 0.

As illustrated in FIG. 13C, in an inclined portion of the first insulator 650a on the first electrode 640a, capacitance C may be formed in the boundary region Ac0, which comes into contact with the electroconductive aqueous solution 695, by using the following Equation 1.

$$C = \varepsilon \frac{A}{d} \quad \text{[Equation 1]}$$

In this case, ε denotes permittivity of a dielectric material 650a, A denotes an area of the boundary region Ac0, and d denotes a thickness of the first dielectric material 650a.

Here, assuming that ε and d are fixed values, the area of the boundary region Ac0 may greatly affect the capacitance C.

That is, as the area of the boundary region Ac0 increases, the capacitance C formed in the boundary area Ac0 may increase.

Meanwhile, a change in curvature of the liquid 630 may lead to a change in the area of the boundary region Ac0, such that in the present disclosure, the area of the boundary region Ac0 or the capacitance C formed in the boundary region Ac0 may be sensed by using the sensor 962.

The capacitance in FIG. 13c may be defined as CAc0.

FIGS. 14A to 14E are diagrams illustrating various curvatures of the liquid lens 600.

Figure 14A:
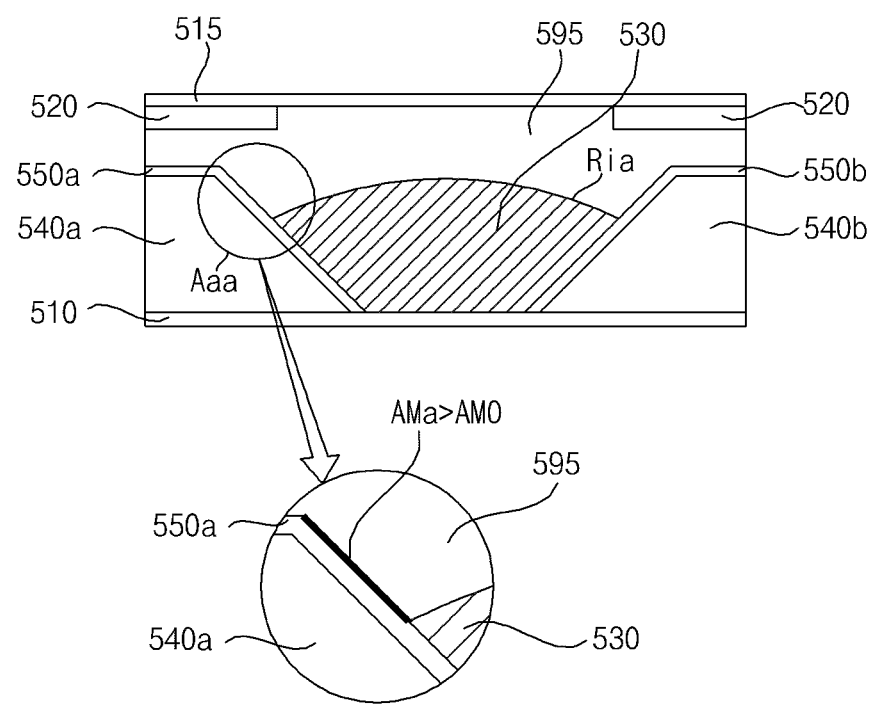
FIGS. 14A to 14E are diagrams illustrating an example of varying a curvature of a liquid lens.

First, FIG. 14A illustrates an example in which by applying an electrical signal to each of the plurality of electrodes LA to LD 640a to 540D and the common electrode 620, a first curvature Ria is formed in the liquid 630.

In FIG. 14A, as the first curvature Ria is formed in the liquid 630, a boundary region Aaa has an area AMa (>AM0). Particularly, in an inclined portion of the first insulator 650a on the first electrode 640a, the boundary region Aaa which comes into contact with the electroconductive aqueous solution 695 has the area AMa.

As shown in Equation 1, the area of the boundary region Aaa in FIG. 14a is greater than that of FIG. 13C, such that capacitance of the boundary region Aaa increases. Meanwhile, the capacitance in FIG. 14A may be defined as CAaa, which is greater than the capacitance CAc0 of FIG. 13C.

In this case, the first curvature Ria may be defined as having a positive polarity value. For example, the first curvature Ria may be defined as having a level of +2.

Figure 14B:
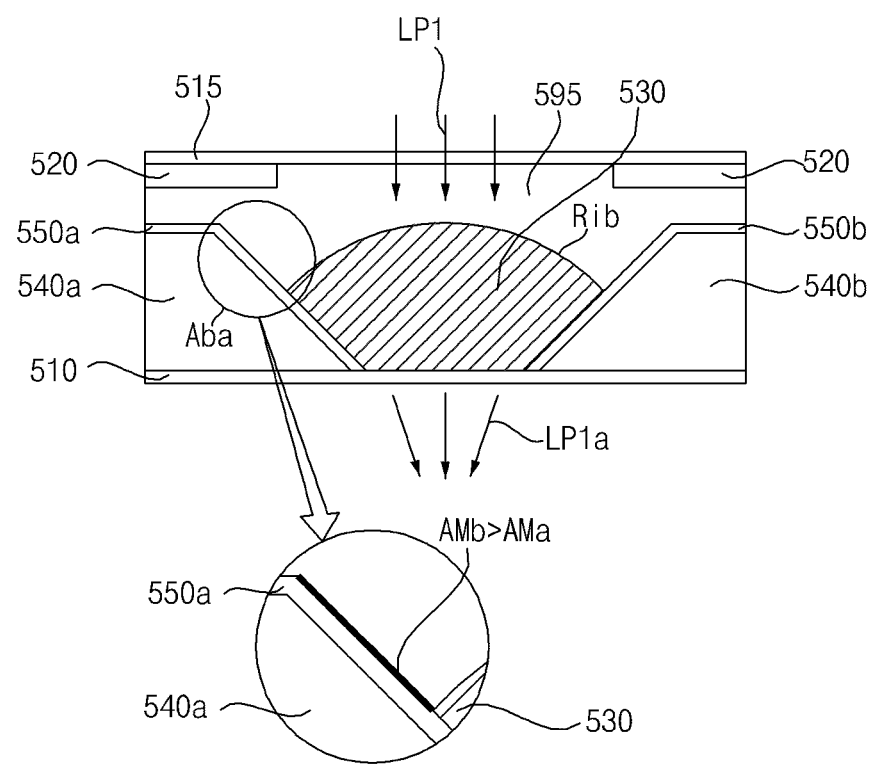

Then, FIG. 14B illustrates an example in which by applying an electrical signal to each of the plurality of electrodes LA to LD 640a to 540D and the common electrode 620, a second curvature Rib is formed in the liquid 630.

In FIG. 14B, as the second curvature Rib is formed in the liquid 630, the boundary region Aba has an area AMb (>AMa). Particularly, in an inclined portion of the first insulator 650a on the first electrode 640a, the boundary region Aba which comes into contact with the electroconductive aqueous solution 695 has the area AMb.

As shown in Equation 1, the area of the boundary region Aba in FIG. 14b is greater than that of FIG. 14A, such that capacitance of the boundary region Aba increases. Meanwhile, the capacitance in FIG. 14B may be defined as CAba, which is greater than the capacitance CAaa of FIG. 14A.

In this case, the second curvature Rib may be defined as having a positive polarity value which is smaller than the first curvature Ria. For example, the second curvature Rib may be defined as having a level of +4.

Referring to FIGS. 14A and 14B, the liquid lens 600 operates as a convex lens, such that output light LP1a is output as the incident light LP1 is concentrated.

Figure 14C:
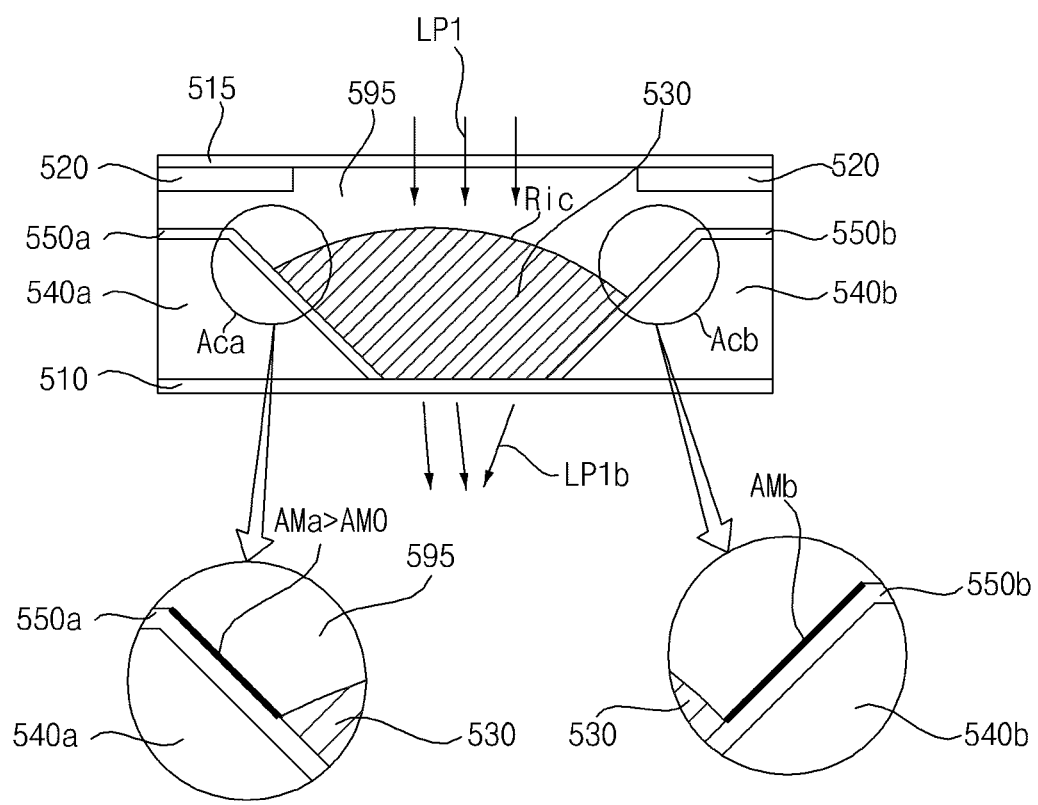

Then, FIG. 14c illustrates an example in which by applying an electrical signal to each of the plurality of electrodes LA to LD 640a to 540d and the common electrode 620, a third curvature Ric is formed in the liquid 630.

Particularly, in FIG. 14C, a left boundary region Aca has an area AMa, and a right boundary region Acb has an area AMb (>AMa).

Particularly, in an inclined portion of the first insulator 650a on the first electrode 640a, the boundary region Aca which comes into contact with the electroconductive aqueous solution 695 has the area AMa, and in an inclined portion of the second insulator 650b on the second electrode 640b, the boundary region Acb which comes into contact with the electroconductive aqueous solution 695 has the area AMb.

Accordingly, capacitance of the left boundary region Aca may be defined as CAaa, and capacitance of the right boundary region Acb may be defined as CAba.

In this case, the third curvature Ric may be defined as having a positive polarity value. For example, the third curvature Ric may be defined as having a level of +3.

Then, referring to FIG. 14c, the liquid lens 600 operates as a convex lens, such that the output light LP1b is output as the incident light LP1 is more concentrated on one side.

Figure 14D:
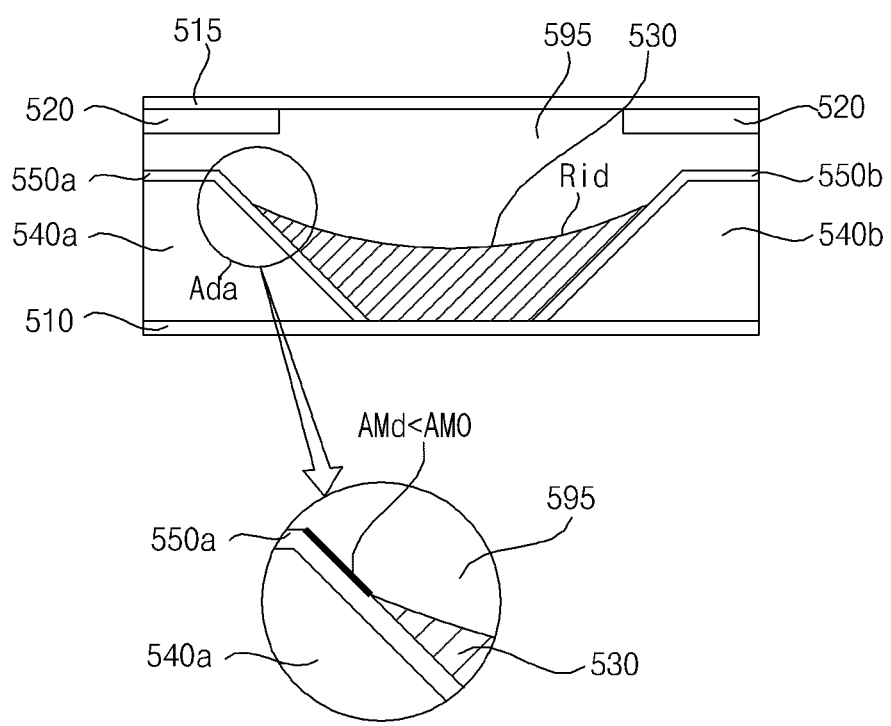

Then, FIG. 14D illustrates an example in which by applying an electrical signal to each of the plurality of electrodes LA to LD 640a to 540d and the common electrode 620, a fourth curvature Rid is formed in the liquid 630.

In FIG. 14D, as the fourth curvature Rid is formed in the liquid 630, a boundary region Ada has an area AMd (<AM0). Particularly, in an inclined portion of the first insulator 650a on the first electrode 640a, the boundary region Ada which comes into contact with the electroconductive aqueous solution 695 has the area AMd.

As shown in Equation 1, the area of the boundary region Ada in FIG. 14d is smaller than that of FIG. 13C, such that capacitance of the boundary region Ada decreases. Meanwhile, the capacitance in FIG. 14D may be defined as CAda, which is smaller than the capacitance CAc0 of FIG. 13C.

In this case, the fourth curvature Rid may be defined as having a negative polarity value. For example, the fourth curvature Rid may be defined as having a level of −2.

Figure 14E:
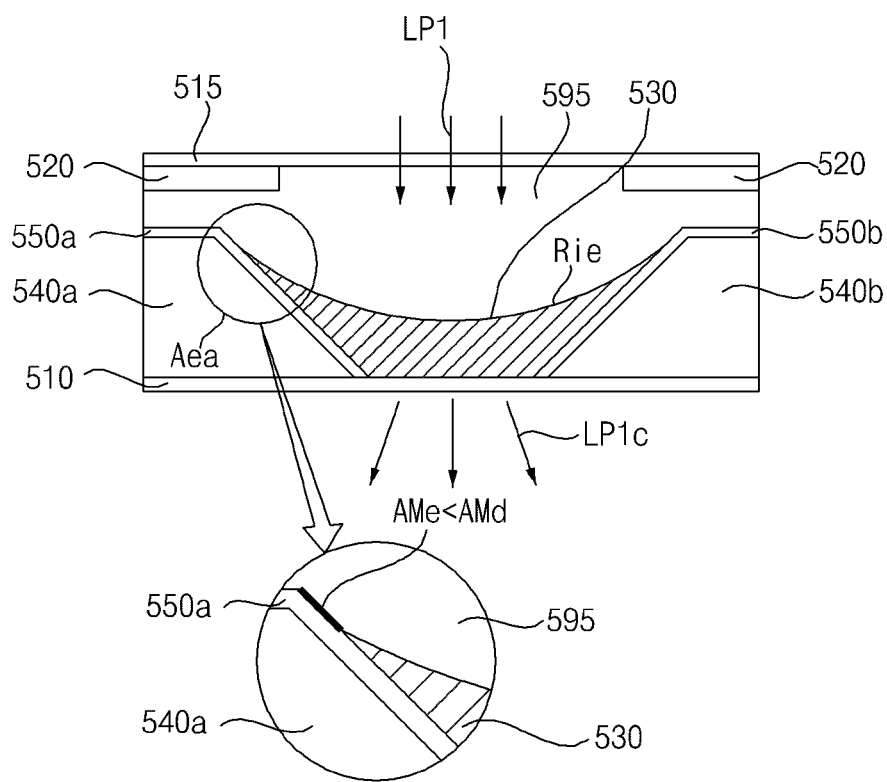

Then, FIG. 14E illustrates an example in which by applying an electrical signal to each of the plurality of electrodes LA to LD 640a to 540d and the common electrode 620, a fifth curvature Rie is formed in the liquid 630.

In FIG. 14E, as the fifth curvature Rie is formed in the liquid 630, a boundary region Aea has an area AMe (<AMd). Particularly, in an inclined portion of the first insulator 650a on the first electrode 640a, the boundary region Aea which comes into contact with the electroconductive aqueous solution 695 has the area AMe.

As shown in Equation 1, the area of the boundary region Aea in FIG. 14e is smaller than that of FIG. 14D, such that capacitance of the boundary region Aea decreases. Meanwhile, the capacitance in FIG. 14E may be defined as CAea, which is smaller than the capacitance CAda of FIG. 14D.

In this case, the fifth curvature Rie may be defined as having a negative polarity value. For example, the fifth curvature Rie may be defined as having a level of −4.

Referring to FIGS. 14D and 14E, the liquid lens 600 operates as a concave lens, such that the output light LP1c is output as the incident light LP1 diverges.

Figure 15A:
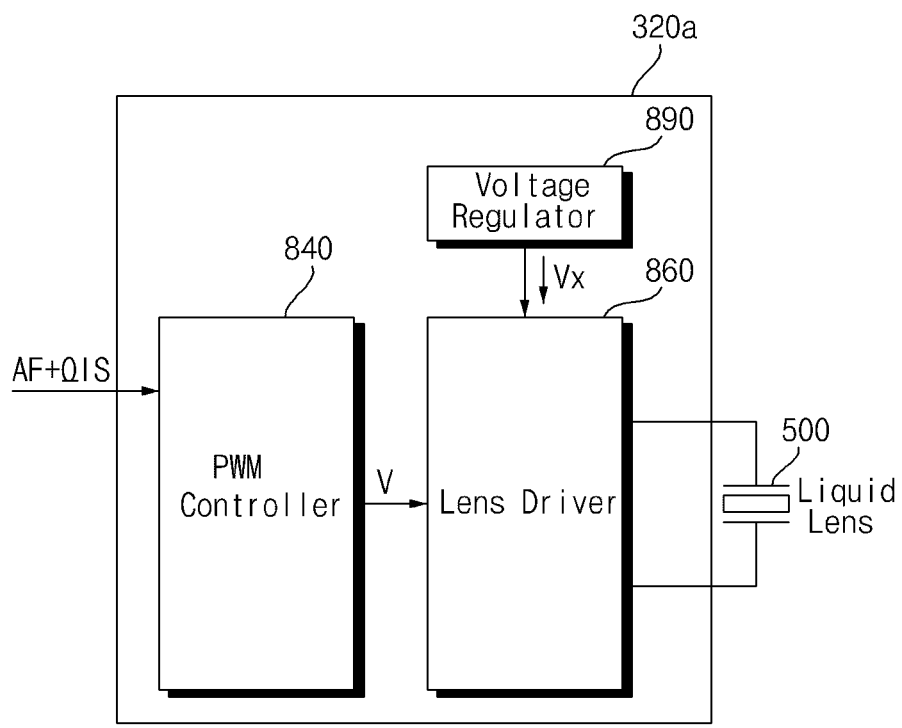
FIGS. 15A and 15B are internal block diagrams illustrating various examples of a second actuator.
Figure 15B:
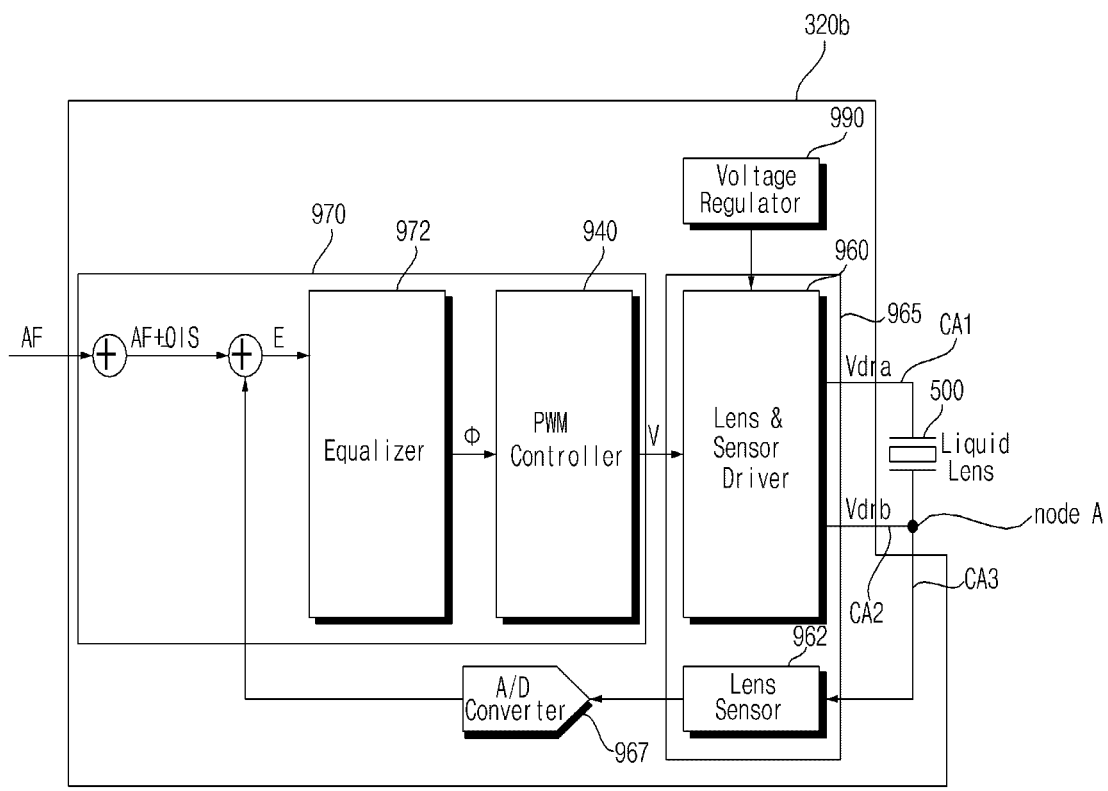

FIGS. 15A and 15B are internal block diagrams illustrating various examples of a second actuator.

First, FIG. 15A is an internal block diagram illustrating an example of the second actuator.

Referring to the drawing, a second actuator 320a of FIG. 15A may include a lens driver 860, a pulse width modulation controller 840, a power supply 890, and a liquid lens 600.

As for the operation of the second actuator 320a of FIG. 15A, the pulse width modulation controller 840 may output a pulse width modulation signal V in response to a target curvature, and the lens driver 860 may output a corresponding voltage to the plurality of electrodes and the common electrode of the liquid lens 600 by using the pulse width modulation signal V of the lens driver 860 and a voltage Vx of the power supply 890.

That is, the second actuator 320a of FIG. 15A may operate as an Open Loop System to vary the curvature of the liquid lens.

FIG. 15B is an internal block diagram illustrating another example of the second actuator.

Referring to the drawing, the second actuator 320b according to an embodiment of the present disclosure includes: a liquid lens 600; a lens driver 960 configured to apply an electrical signal to the liquid lens 600; a sensor device 962 configured to sense a curvature of the liquid lens 600 which is formed based on the electrical signal; and a processor 970 configured to control the lens driver 960 based on the sensed curvature so that a target curvature of the liquid lens 600 may be formed.

Meanwhile, unlike the drawing, the second actuator 320b may not include the processor 970, and the processor 970 may be provided in the processor 270 of FIG. 4.

The sensor device 962 may sense a size of an area, or a change in the area, of the boundary region Ac0 between the electroconductive aqueous solution 695 and the dielectric material on the electrode of the liquid lens 600. Accordingly, the curvature of the lens may be sensed rapidly and accurately.

The second actuator 320b according to an embodiment of the present disclosure may further include a power supply 990 supplying power, and an AD converter 967 converting a signal, related to the capacitance sensed by the sensor device 962, into a digital signal.

The second actuator 320b may further include a plurality of conductive lines CA1 and CA2 provided for delivering electrical signals, output from the lens driver 960, to the respective electrodes (common electrode and a plurality of electrodes) in the liquid lens 600, and a switching element SWL disposed between the sensor device 962 and any one conductive line CA2 among the plurality of conductive lines.

In the drawing, an example is illustrated in which the switching element SWL is disposed between the sensor device 962 and the conductive line CA2 for applying an electrical signal to any one of the plurality of electrodes in the liquid lens 600. In this case, a point of contact between the conductive line CA2 and one end of the switching element SWL or the liquid lens 600 may be referred to as node A.

In the present disclosure, in order to sense a curvature of the liquid lens 600, an electrical signal may be applied to the respective electrodes (common electrode and a plurality of electrodes) in the liquid lens 600.

For example, the switching element SWL may be turned on for a first period of time.

In this case, if an electrical signal is applied to the electrodes in the liquid lens 600 when the switching element SWL is turned on and electrically connected to the sensor device 962, a curvature is formed in the liquid lens 600, and an electrical signal corresponding to the formed curvature may be supplied to the sensor device 962 through the switching element SWL.

Accordingly, while the switching element SWL is turned on, the sensor device 962 may sense a size of an area, or a change in the area, of the boundary region Ac0 between the insulator on the electrodes in the liquid lens 600 and the electroconductive aqueous solution, or may sense capacitance of the boundary region Ac0.

Then, while the switching element SWL is turned on for a second period of time, an electrical signal may be applied continuously to the electrodes in the liquid lens 600, such that a curvature may be formed in the liquid 630.

Subsequently, while the switching element SWL is turned off for a third period of time, an electrical signal may not be applied to the electrodes in the liquid lens 600, or a low-level electrical signal may be applied thereto.

Next, the switching element SWL may be turned on for a fourth period of time.

In this case, if an electrical signal is applied to the electrodes in the liquid lens 600 when the switching element SWL is turned on and electrically connected to the sensor device 962, a curvature is formed in the liquid lens 600, and an electrical signal corresponding to the formed curvature may be supplied to the sensor device 962 through the switching element SWL.

Meanwhile, if a curvature, calculated based on the capacitance sensed over the first period of time, is less than a target curvature, the processor 970 may increase a pulse width of pulse width modulation signal supplied to the driver 960, so that the curvature may reach the target curvature.

Accordingly, a time difference between pulses applied to each of the common electrode 630 and the plurality of electrodes may increase, thereby resulting in an increase in the curvature formed in the liquid 630.

If an electrical signal is applied to the electrodes in liquid lens 600 when the switching element SWL is turned on and electrically connected to the sensor device 962 during the fourth period of time, a curvature is formed in the liquid lens 600, and an electrical signal corresponding to the formed curvature may be supplied to the sensor device 962 through the switching element SWL.

Accordingly, while the switching element SWL is turned on, the sensor device 962 may sense a size of an area, or a change in the area, of the boundary region Ac0 between the insulator on the electrodes in the liquid lens 600 and the electroconductive aqueous solution 695, or may sense capacitance of the boundary region Ac0.

Accordingly, the processor 970 may calculate the curvature based on the sensed capacitance, and may determine whether the curvature reaches the target curvature. If the curvature reaches the target curvature, the processor 970 may control a corresponding electrical signal to be supplied to the respective electrodes.

As described above, by providing the electrical signal, the curvature may be formed in the liquid 630, and the curvature of the liquid 630 may be sensed immediately, such that the curvature of the liquid lens 600 may be identified rapidly and accurately.

In the drawing, the lens driver 960 and the sensor device 962 may be formed as one module 965.

In the drawing, the lens driver 960, the sensor device 962, the processor 970, the power supply 990, the AD converter 967, and the switching element SWL may be implemented on a single chip such as a system on chip (SOC).

The processor 970 may increase a level of voltage applied to the liquid lens 600 or may increase a pulse width, so that the curvature of the liquid lens 600 may increase.

Based on the capacitance sensed by the sensor device 962, the processor 970 may calculate the curvature of the liquid lens 600.

In this case, the processor 970 may calculate the curvature of the liquid lens 600 which increases as the capacitance sensed by the sensor device 962 increases.

Further, the processor 970 may control the liquid lens 600 to have a target curvature.

Based on the capacitance sensed by the sensor device 962, the processor 970 may calculate the curvature of the liquid lens 600, and based on the calculated curvature and the target curvature, the processor 970 may output a pulse width modulation signal V to the lens driver 960.

Thus, by using the pulse width modulation signal V and voltages Lv1 and Lv2 of the power supply 990, the lens driver 960 may output a corresponding electrical signal to the plurality of electrodes LA to LD 640a to 540d and the common electrode 620.

As described above, by sensing and feeding back the capacitance of the liquid lens 600, the electrical signal may be applied to the liquid lens 600 to vary the curvature of the liquid lens 600, such that the curvature of the lens may be varied rapidly and accurately.

The processor 970 may include an equalizer 972 configured to calculate a curvature error based on the calculated curvature and the target curvature, and a pulse width modulation controller 940 configured to generate and output a pulse width modulation signal V based on the calculated curvature error Φ.

Accordingly, if the calculated curvature is greater than the target curvature, the processor 970 may increase a duty cycle of the pulse width modulation signal V based on the calculated curvature error Φ, thereby rapidly and accurately varying the curvature of the liquid lens 600.

The processor 970 may receive focus information AF from an image processor 930 and tremble information OIS from a gyro sensor (not shown), and may determine the target curvature based on the focus information AF and the tremble information OIS.

In this case, an update period for updating the determined target curvature is desirably longer than an update period of the calculated curvature based on the sensed capacitance of the liquid lens 600.

As a result, the update period of the calculated curvature is shorter than the update period of the target curvature, such that by varying the curvature of the liquid lens 600, the curvature of the liquid lens 600 may be changed rapidly to a desired curvature.

The prism apparatus 692, including the prism module 692a and the lens module 692b as illustrated in FIGS. 5A to 15B, may be applied to various electronic devices such as the mobile terminal 100 of FIG. 2, vehicle, TV, drone, robot, robot cleaner, door, and the like.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:
1. A prism apparatus comprising:
a prism configured to reflect input light toward a first reflected direction;
a first actuator configured to change an angle of the prism about a first rotation axis to change the first reflected direction based on a first control signal;
a lens configured to output the light reflected by the prism toward a second reflected direction; and
a second actuator configured to change an angle of the lens about a second rotation axis to change the second reflected direction based on a second control signal,
wherein in response to a movement causing rotation of the prism about the first rotation axis by a first angle and rotation of the lens about the second rotation axis by a second angle, the first actuator is configured to rotate the prism in a third direction opposite the first reflected direction by a third angle in response to the first control signal, and the second actuator is configured to rotate the lens in a fourth direction opposite the second reflected direction by a fourth angle in response to the second control signal.
2. The prism apparatus of claim 1, further comprising a frame in which the lens is mounted,
wherein the second actuator comprises a first driving device and a second driving device connected to both ends of the frame, and changes the second reflected direction by moving at least one of the first driving device and the second driving device.

3. The prism apparatus of claim 1, wherein the lens comprises a liquid lens, and
wherein by applying an electrical signal to the liquid lens, the second actuator changes a curvature of the liquid lens.

4. The prism apparatus of claim 1, wherein the first rotation axis of the prism is perpendicular to the second rotation axis of the lens.

5. The prism apparatus of claim 1, further comprising:
a first hall sensor configured to sense an angle change of the prism based on a first magnetic field; and
a second hall sensor configured to sense an angle change of the lens based on a second magnetic field.

6. The prism apparatus of claim 1, wherein the first actuator comprises a first drive magnet and a first drive coil.

7. The prism apparatus of claim 6, further comprising:
a prism holder configured to secure the prism;
a first yoke coupled to a rear of the prism holder;
the first drive magnet coupled to a rear of the first yoke;
a first coil holder including a plurality of protrusions protruding toward the prism holder, each of the plurality of protrusions having an opening, and the openings of the plurality of protrusions defining the first rotation axis,
wherein the first drive coil is disposed between the first coil holder and the first yoke, and
wherein the prism holder includes a plurality of bosses configured to engage with the openings of the plurality of protrusions to allow rotation of the prism about the first rotation axis.

8. The prism apparatus of claim 1, wherein the second actuator comprises a second drive magnet.

9. The prism apparatus of claim 1, wherein a refractive index of the prism is 1.7 or greater.

10. The prism apparatus of claim 3, wherein the second actuator comprises:
a lens driver configured to apply the electrical signal to the liquid lens; and
a sensor device configured to sense a curvature of the liquid lens formed based on the electrical signal.

11. The prism apparatus of claim 10, wherein the sensor device is configured to sense a size of an area or the change in the area, of a boundary region between an insulator on an electrode in the liquid lens and an electroconductive aqueous solution.

12. The prism apparatus of claim 11, wherein in response to the size of the area or the change in the area, of the boundary region between the insulator on the electrode in the liquid lens and the electroconductive aqueous solution, the sensor device is configured to sense capacitance formed by the electroconductive aqueous solution and the electrode.

13. The prism apparatus of claim 11, wherein the second actuator further comprises:

a plurality of conductive lines provided for delivering a plurality of electrical signals, output from the lens driver, to the liquid lens; and
a switching element disposed between any one of the plurality of conductive lines and the sensor device.

14. The prism apparatus of claim 10, wherein the second actuator further comprises a processor configured to calculate a curvature of the liquid lens based on a capacitance sensed by the sensor device, and to output a pulse width modulation signal to the lens driver based on the calculated curvature and a target curvature.

15. The prism apparatus of claim 14, wherein in response to the calculated curvature being less than the target curvature, the processor increases a duty cycle of the pulse width modulation signal.

16. A camera apparatus comprising:
a gyro sensor configured to sense a movement of the camera apparatus;
a prism apparatus configured to direct input light;
a lens apparatus comprising a plurality of lenses configured to be adjusted to achieve variable focus; and
an image sensor configured to generate an image signal based on the input light,
wherein the prism apparatus comprises:
a prism configured to reflect the input light toward a first reflected direction;
a first actuator configured to change an angle of the prism about a first rotation axis to change the first reflected direction based on a first control signal;
a lens configured to output the light reflected by the prism toward a second reflected direction; and
a second actuator configured to change an angle of the lens about a second rotation axis to change the second reflected direction based on a second control signal,
wherein in response to a movement causing rotation of the prism about the first rotation axis by a first angle and rotation of the lens about the second rotation axis by a second angle, the first actuator is configured to rotate the prism in a third direction opposite the first reflected direction by a third angle in response to the first control signal, and the second actuator is configured to rotate the lens in a fourth direction opposite the second reflected direction by a fourth angle in response to the second control signal.

17. The camera apparatus of claim 16, wherein the image sensor receives light corresponding to an object being photographed from the prism apparatus while the image sensor is positioned perpendicularly to the object being photographed.

18. The camera apparatus of claim 16, wherein one or more of the plurality of lenses are moved along an axis for achieving variable focus, and the axis is perpendicular to a direction of the input light which is input into the prism apparatus.

* * * * *